(12) United States Patent
Burtner et al.

(10) Patent No.: US 10,127,524 B2
(45) Date of Patent: Nov. 13, 2018

(54) SHARED COLLABORATION CANVAS

(75) Inventors: Russ Burtner, Everett, WA (US); Kevin Russ, Bellevue, WA (US); Ian Sands, Seattle, WA (US); John Snavely, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 12/472,101

(22) Filed: May 26, 2009

(65) Prior Publication Data

US 2010/0306004 A1 Dec. 2, 2010

(51) Int. Cl.
| | |
|---|---|
| G06Q 10/00 | (2012.01) |
| G06F 15/18 | (2006.01) |
| G06Q 30/00 | (2012.01) |
| G06Q 10/10 | (2012.01) |
| G06Q 50/00 | (2012.01) |

(52) U.S. Cl.
CPC ......... *G06Q 10/101* (2013.01); *G06Q 10/103* (2013.01); *G06Q 50/01* (2013.01); *G06Q 10/10* (2013.01)

(58) Field of Classification Search
CPC .......... G06Q 10/00; G06Q 3/00; G06Q 99/00; G06Q 10/10
USPC ...................................... 705/300, 9; 709/757
See application file for complete search history.

(56) References Cited

U.S. PATENT DOCUMENTS

| | | | |
|---|---|---|---|
| 4,831,552 A | 5/1989 | Scully et al. | |
| 5,297,250 A | 3/1994 | Leroy et al. | |
| 5,495,269 A | 2/1996 | Elrod et al. | |
| 5,566,291 A | 10/1996 | Boulton et al. | |
| 5,675,752 A | 10/1997 | Scott et al. | |
| 5,704,029 A | 12/1997 | Wright, Jr. | |

(Continued)

FOREIGN PATENT DOCUMENTS

| | | |
|---|---|---|
| CN | 1551567 A | 12/2004 |
| CN | 1723431 A | 1/2006 |

(Continued)

OTHER PUBLICATIONS

Krebs, Supporting Collaboration in Heterogeneous Enviornments, Journal of Management Information Systems, Spring 2004, vol. 20 No. 4, pp. 199-227 (Year: 2004).*

(Continued)

*Primary Examiner* — Ivan R Goldberg
*Assistant Examiner* — Venay Puri
(74) *Attorney, Agent, or Firm* — Merchant & Gould P.C.

(57) ABSTRACT

A computing system causes a plurality of display devices to display user interfaces containing portions of a canvas shared by a plurality of users. The canvas is a graphical space containing discrete graphical elements located at arbitrary locations within the canvas. Each of the discrete graphical elements graphically represents a discrete resource. When a user interacts with a resource in the set of resources, the computing system modifies the canvas to include an interaction element indicating that the user is interacting with the resource. The computer system then causes the display devices to update the user interfaces such that the user interfaces reflect a substantially current state of the canvas. In this way, the users may be able to understand which ones of the users are interacting with which ones of the resources.

19 Claims, 5 Drawing Sheets

(56) References Cited

U.S. PATENT DOCUMENTS

| | | |
|---|---|---|
| 5,717,869 A | 2/1998 | Moran et al. |
| 5,802,299 A | 9/1998 | Logan et al. |
| 5,821,925 A | 10/1998 | Carey et al. |
| 5,821,932 A | 10/1998 | Pittore |
| 5,893,098 A | 4/1999 | Peters et al. |
| 5,907,324 A | 5/1999 | Larson et al. |
| 6,016,478 A | 1/2000 | Zhang et al. |
| 6,018,346 A | 1/2000 | Moran |
| 6,119,147 A | 9/2000 | Toomey |
| 6,192,395 B1 | 2/2001 | Lerner |
| 6,208,399 B1 | 3/2001 | Atlas et al. |
| 6,230,185 B1 | 5/2001 | Salas et al. |
| 6,353,436 B1 * | 3/2002 | Reichlen ............... 345/427 |
| 6,553,417 B1 | 4/2003 | Gampper |
| 6,564,246 B1 | 5/2003 | Varma |
| 6,586,349 B1 | 7/2003 | Jeon |
| 6,633,315 B1 | 10/2003 | Sobeski et al. |
| 6,639,836 B1 | 10/2003 | Hung |
| 6,670,970 B1 * | 12/2003 | Bonura et al. ............ 715/768 |
| 6,735,615 B1 | 5/2004 | Iwayama et al. |
| 6,738,075 B1 | 5/2004 | Torres et al. |
| 6,926,799 B2 | 8/2005 | Yeom |
| 6,933,495 B1 | 8/2005 | Yeom |
| 7,035,865 B2 | 4/2006 | Doss et al. |
| 7,036,076 B2 | 4/2006 | Anwar |
| 7,051,285 B1 | 5/2006 | Harrison et al. |
| 7,073,127 B2 | 7/2006 | Zhao et al. |
| 7,075,513 B2 | 7/2006 | Silfverberg et al. |
| 7,124,164 B1 | 10/2006 | Chemtob |
| 7,171,567 B1 | 1/2007 | Bayer et al. |
| 7,203,479 B2 | 4/2007 | Deeds |
| 7,225,257 B2 | 5/2007 | Aoike et al. |
| 7,233,933 B2 | 6/2007 | Horvitz et al. |
| 7,242,389 B1 | 7/2007 | Stern |
| 7,246,316 B2 | 7/2007 | Furlong et al. |
| 7,248,677 B2 | 7/2007 | Randall et al. |
| 7,251,786 B2 | 7/2007 | Wynn et al. |
| 7,269,787 B2 | 9/2007 | Amitay et al. |
| 7,299,193 B2 | 11/2007 | Cragun et al. |
| 7,299,405 B1 | 11/2007 | Lee et al. |
| 7,299,418 B2 | 11/2007 | Dieberger |
| 7,401,300 B2 | 7/2008 | Murmi |
| 7,426,297 B2 | 9/2008 | Zhang et al. |
| 7,447,713 B1 | 11/2008 | Berkheimer |
| 7,451,183 B2 | 11/2008 | Morinigo et al. |
| 7,454,439 B1 | 11/2008 | Gansner |
| 7,466,334 B1 | 12/2008 | Baba |
| 7,469,222 B1 | 12/2008 | Glazer |
| 7,478,129 B1 * | 1/2009 | Chemtob ............... 709/204 |
| 7,512,906 B1 | 3/2009 | Baier et al. |
| 7,554,576 B2 | 6/2009 | Erol et al. |
| 7,571,210 B2 | 8/2009 | Swanson et al. |
| 7,590,941 B2 | 9/2009 | Wee |
| 7,599,989 B2 | 10/2009 | Stevens et al. |
| 7,606,862 B2 | 10/2009 | Swearingen et al. |
| 7,627,830 B1 | 12/2009 | Expinoza et al. |
| 7,636,754 B2 | 12/2009 | Zhu et al. |
| 7,669,141 B1 | 2/2010 | Pegg |
| 7,679,518 B1 | 3/2010 | Pabla et al. |
| 7,730,411 B2 | 6/2010 | Chotai et al. |
| 7,743,098 B2 | 6/2010 | Anglin et al. |
| 7,764,247 B2 | 7/2010 | Blanco et al. |
| 7,770,116 B2 | 8/2010 | Zhang et al. |
| 7,774,221 B2 | 8/2010 | Miller et al. |
| 7,799,706 B2 | 9/2010 | Yeom |
| 7,818,678 B2 | 10/2010 | Massand |
| 7,869,941 B2 | 1/2011 | Coughlin et al. |
| 7,911,409 B2 | 3/2011 | Chatterjee et al. |
| 7,919,142 B1 | 4/2011 | Yeom |
| 7,941,399 B2 | 5/2011 | Bailor et al. |
| 7,962,525 B2 | 6/2011 | Kansal |
| 7,984,387 B2 | 7/2011 | Batthish et al. |
| 7,992,089 B2 | 8/2011 | Murray et al. |
| 8,032,832 B2 | 10/2011 | Russ et al. |
| 8,099,458 B2 | 1/2012 | Burtner, IV et al. |
| 8,126,974 B2 | 2/2012 | Lyle et al. |
| 8,150,719 B2 | 4/2012 | Perella et al. |
| 8,161,419 B2 | 4/2012 | Palahnuk et al. |
| 8,204,942 B2 | 6/2012 | Roskind et al. |
| 8,214,748 B2 | 7/2012 | Srikanth et al. |
| 8,330,795 B2 | 12/2012 | Iyer et al. |
| 8,358,762 B1 | 1/2013 | Renner et al. |
| 8,385,964 B2 | 2/2013 | Haney |
| 8,423,883 B1 | 4/2013 | Stockmann |
| 8,437,461 B1 | 5/2013 | Gartner et al. |
| 8,452,839 B2 | 5/2013 | Heikes et al. |
| 8,517,888 B1 | 8/2013 | Brookins |
| 8,560,487 B2 | 10/2013 | Jhoney et al. |
| 8,583,148 B2 | 11/2013 | Ollila et al. |
| 8,606,517 B1 | 12/2013 | Ehrlacher et al. |
| 8,631,119 B2 | 1/2014 | Malkin et al. |
| 8,682,973 B2 | 3/2014 | Kotler et al. |
| 8,768,308 B2 | 7/2014 | Kim et al. |
| 8,826,117 B1 | 9/2014 | Junee et al. |
| 2001/0040592 A1 | 11/2001 | Foreman et al. |
| 2002/0060201 A1 | 5/2002 | Yeom |
| 2002/0143876 A1 | 10/2002 | Boyer et al. |
| 2002/0143877 A1 | 10/2002 | Hackbarth et al. |
| 2003/0020805 A1 | 1/2003 | Allen et al. |
| 2003/0038831 A1 | 2/2003 | Engelfriet |
| 2003/0122863 A1 | 7/2003 | Dieberger et al. |
| 2003/0137539 A1 | 7/2003 | Dees |
| 2003/0142133 A1 * | 7/2003 | Brown et al. ............ 345/768 |
| 2003/0158900 A1 * | 8/2003 | Santos ............ 709/205 |
| 2003/0209519 A1 | 11/2003 | Yeom |
| 2003/0222890 A1 | 12/2003 | Salesin et al. |
| 2004/0016876 A1 | 1/2004 | Yeom |
| 2004/0024822 A1 * | 2/2004 | Werndorfer et al. ......... 709/206 |
| 2004/0027370 A1 | 2/2004 | Jaeger |
| 2004/0030992 A1 | 2/2004 | Moisa et al. |
| 2004/0062383 A1 | 4/2004 | Sylvain |
| 2004/0085354 A1 | 5/2004 | Massand |
| 2004/0128350 A1 * | 7/2004 | Topfl et al. ............ 709/204 |
| 2004/0150627 A1 | 8/2004 | Luman et al. |
| 2004/0161090 A1 | 8/2004 | Digate et al. |
| 2004/0169683 A1 | 9/2004 | Chiu et al. |
| 2004/0175036 A1 | 9/2004 | Graham |
| 2004/0196286 A1 | 10/2004 | Guzik |
| 2004/0254998 A1 | 12/2004 | Horvitz |
| 2004/0263636 A1 | 12/2004 | Cutler et al. |
| 2004/0267701 A1 | 12/2004 | Horvitz et al. |
| 2005/0005025 A1 | 1/2005 | Harville et al. |
| 2005/0018828 A1 * | 1/2005 | Nierhaus et al. ......... 379/202.01 |
| 2005/0055625 A1 | 3/2005 | Kloss |
| 2005/0081160 A1 | 4/2005 | Wee et al. |
| 2005/0088410 A1 * | 4/2005 | Chaudhri ............ 345/157 |
| 2005/0091571 A1 * | 4/2005 | Leichtling ............ 715/500 |
| 2005/0091596 A1 | 4/2005 | Anthony et al. |
| 2005/0125246 A1 | 6/2005 | Muller et al. |
| 2005/0125717 A1 | 6/2005 | Segal et al. |
| 2005/0138109 A1 | 6/2005 | Redlich et al. |
| 2005/0138570 A1 | 6/2005 | Good et al. |
| 2005/0171830 A1 | 8/2005 | Miller et al. |
| 2005/0246642 A1 | 11/2005 | Valderas |
| 2006/0004911 A1 | 1/2006 | Becker |
| 2006/0010023 A1 | 1/2006 | Tromczynski et al. |
| 2006/0010197 A1 | 1/2006 | Overden et al. |
| 2006/0026253 A1 | 2/2006 | Kessen et al. |
| 2006/0053380 A1 | 3/2006 | Spataro et al. |
| 2006/0067250 A1 | 3/2006 | Boyer et al. |
| 2006/0080610 A1 | 4/2006 | Kaminsky |
| 2006/0082594 A1 | 4/2006 | Vafiadism |
| 2006/0132507 A1 | 6/2006 | Wang |
| 2006/0136828 A1 * | 6/2006 | Asano ............ 715/733 |
| 2006/0143063 A1 | 6/2006 | Braun et al. |
| 2006/0143064 A1 | 6/2006 | Mock et al. |
| 2006/0146765 A1 * | 7/2006 | Van De Sluis et al. ...... 370/338 |
| 2006/0161585 A1 * | 7/2006 | Clarke et al. ............ 707/104.1 |
| 2006/0167996 A1 | 7/2006 | Orsolini et al. |
| 2006/0168533 A1 | 7/2006 | Yip et al. |
| 2006/0171515 A1 | 8/2006 | Hintermeister et al. |
| 2006/0184872 A1 | 8/2006 | Dontcheva et al. |
| 2006/0190547 A1 | 8/2006 | Bhogal et al. |
| 2006/0195587 A1 | 8/2006 | Cadiz et al. |

(56) References Cited

U.S. PATENT DOCUMENTS

| | | |
|---|---|---|
| 2006/0213443 A1 | 9/2006 | Yeom |
| 2006/0234735 A1 | 10/2006 | Digate et al. |
| 2006/0239212 A1 | 10/2006 | Pirzada et al. |
| 2006/0259875 A1 | 11/2006 | Collins et al. |
| 2006/0265398 A1 | 11/2006 | Kaufman |
| 2007/0005752 A1 | 1/2007 | Chawla et al. |
| 2007/0011231 A1 | 1/2007 | Manion et al. |
| 2007/0083597 A1 | 4/2007 | Salesky et al. |
| 2007/0100937 A1* | 5/2007 | Burtner et al. ............... 709/204 |
| 2007/0106724 A1 | 5/2007 | Gorti et al. |
| 2007/0112926 A1 | 5/2007 | Brett et al. |
| 2007/0150583 A1 | 6/2007 | Asthana et al. |
| 2007/0168447 A1 | 7/2007 | Chen et al. |
| 2007/0174389 A1 | 7/2007 | Armstrong |
| 2007/0185870 A1 | 8/2007 | Hogue |
| 2007/0189487 A1 | 8/2007 | Sharland et al. |
| 2007/0214423 A1* | 9/2007 | Teplov et al. ................. 715/751 |
| 2007/0219645 A1 | 9/2007 | Thomas et al. |
| 2007/0226032 A1 | 9/2007 | White |
| 2007/0245238 A1 | 10/2007 | Fugitt |
| 2007/0253424 A1 | 11/2007 | Herot et al. |
| 2007/0276909 A1 | 11/2007 | Chavda et al. |
| 2007/0279416 A1 | 12/2007 | Cobb |
| 2007/0294612 A1 | 12/2007 | Drucker et al. |
| 2007/0300185 A1 | 12/2007 | Macbeth et al. |
| 2008/0005235 A1 | 1/2008 | Hegde |
| 2008/0008458 A1 | 1/2008 | Gudipaty et al. |
| 2008/0013698 A1 | 1/2008 | Holtzberg |
| 2008/0022225 A1 | 1/2008 | Erl |
| 2008/0040187 A1 | 2/2008 | Carraher et al. |
| 2008/0040188 A1 | 2/2008 | Klausmeier |
| 2008/0059889 A1 | 3/2008 | Parker |
| 2008/0065580 A1* | 3/2008 | Spence et al. .................. 706/62 |
| 2008/0066016 A1 | 3/2008 | Dowdy et al. |
| 2008/0084984 A1 | 4/2008 | Levy et al. |
| 2008/0086688 A1 | 4/2008 | Chandratillake |
| 2008/0098328 A1* | 4/2008 | Rollin et al. .................. 715/810 |
| 2008/0114844 A1* | 5/2008 | Sanchez et al. ............. 709/206 |
| 2008/0115076 A1 | 5/2008 | Frank et al. |
| 2008/0136897 A1 | 6/2008 | Morishima et al. |
| 2008/0141126 A1 | 6/2008 | Johnson et al. |
| 2008/0177782 A1 | 7/2008 | Poston et al. |
| 2008/0189624 A1 | 8/2008 | Chotai et al. |
| 2008/0239995 A1 | 10/2008 | Lee et al. |
| 2008/0244442 A1 | 10/2008 | Vaselova et al. |
| 2008/0263460 A1 | 10/2008 | Altberg |
| 2008/0276174 A1 | 11/2008 | Hintermeister et al. |
| 2008/0288889 A1 | 11/2008 | Hunt |
| 2008/0300944 A1 | 12/2008 | Surazski et al. |
| 2008/0303746 A1* | 12/2008 | Schlottmann et al. ........ 345/1.2 |
| 2008/0307322 A1 | 12/2008 | Stochosky |
| 2008/0320082 A1 | 12/2008 | Kuhlke et al. |
| 2009/0006980 A1 | 1/2009 | Hawley |
| 2009/0006982 A1 | 1/2009 | Curtis et al. |
| 2009/0007014 A1 | 1/2009 | Coomer et al. |
| 2009/0019367 A1 | 1/2009 | Cavagnari et al. |
| 2009/0030766 A1 | 1/2009 | Denner et al. |
| 2009/0037848 A1 | 2/2009 | Tewari et al. |
| 2009/0043856 A1 | 2/2009 | Darby |
| 2009/0055739 A1 | 2/2009 | Murillo et al. |
| 2009/0089055 A1 | 4/2009 | Caspi |
| 2009/0094367 A1 | 4/2009 | Song et al. |
| 2009/0109180 A1 | 4/2009 | Do |
| 2009/0112703 A1 | 4/2009 | Brown |
| 2009/0119255 A1 | 5/2009 | Frank et al. |
| 2009/0119604 A1 | 5/2009 | Simard |
| 2009/0129596 A1 | 5/2009 | Chavez et al. |
| 2009/0138552 A1 | 5/2009 | Johnson et al. |
| 2009/0138826 A1 | 5/2009 | Barros |
| 2009/0183095 A1 | 7/2009 | Deitsch |
| 2009/0204671 A1 | 8/2009 | Hawkins et al. |
| 2009/0210793 A1 | 8/2009 | Yee et al. |
| 2009/0222741 A1 | 9/2009 | Shaw et al. |
| 2009/0228569 A1 | 9/2009 | Kalmanje et al. |
| 2009/0234721 A1 | 9/2009 | Bigelow et al. |
| 2009/0235177 A1 | 9/2009 | Saul et al. |
| 2009/0249223 A1 | 10/2009 | Barsook et al. |
| 2009/0254843 A1* | 10/2009 | Van Wie et al. ............... 715/757 |
| 2009/0265632 A1 | 10/2009 | Russ et al. |
| 2009/0282339 A1 | 11/2009 | Van Melle et al. |
| 2009/0309846 A1 | 12/2009 | Trachtenberg |
| 2009/0313584 A1 | 12/2009 | Kerr et al. |
| 2009/0319562 A1 | 12/2009 | Holm-Petersen |
| 2010/0031152 A1 | 2/2010 | Villaron et al. |
| 2010/0037140 A1 | 2/2010 | Penner et al. |
| 2010/0037151 A1 | 2/2010 | Ackerman |
| 2010/0058201 A1* | 3/2010 | Harvey et al. ................. 715/753 |
| 2010/0097331 A1 | 4/2010 | Wu |
| 2010/0114691 A1 | 5/2010 | Wu et al. |
| 2010/0114991 A1 | 5/2010 | Chaudhary et al. |
| 2010/0131868 A1 | 5/2010 | Chawla et al. |
| 2010/0138756 A1 | 6/2010 | Saund et al. |
| 2010/0149307 A1 | 6/2010 | Iyer et al. |
| 2010/0174993 A1 | 7/2010 | Pennington et al. |
| 2010/0201707 A1 | 8/2010 | Rasmussen et al. |
| 2010/0235216 A1 | 9/2010 | Hehmeyer et al. |
| 2010/0235763 A1 | 9/2010 | Massand |
| 2010/0241196 A1 | 9/2010 | Tarara et al. |
| 2010/0251140 A1 | 9/2010 | Tipirneni |
| 2010/0268705 A1 | 10/2010 | Douglas et al. |
| 2010/0279266 A1 | 11/2010 | Laine et al. |
| 2010/0306018 A1 | 12/2010 | Burtner et al. |
| 2010/0312706 A1 | 12/2010 | Combet et al. |
| 2010/0324963 A1 | 12/2010 | Gupta et al. |
| 2011/0022967 A1 | 1/2011 | Vijayakumar et al. |
| 2011/0105092 A1 | 5/2011 | Felt et al. |
| 2011/0107241 A1 | 5/2011 | Moore |
| 2011/0113348 A1 | 5/2011 | Twiss et al. |
| 2011/0113351 A1 | 5/2011 | Phillips |
| 2011/0137894 A1 | 6/2011 | Narayanan et al. |
| 2011/0154180 A1 | 6/2011 | Evantisky et al. |
| 2011/0161130 A1 | 6/2011 | Whalin et al. |
| 2011/0185288 A1 | 7/2011 | Gupta et al. |
| 2011/0239142 A1 | 9/2011 | Steeves et al. |
| 2011/0282871 A1 | 11/2011 | Seefeld et al. |
| 2011/0289142 A1 | 11/2011 | Whalin et al. |
| 2011/0289433 A1 | 11/2011 | Whalin et al. |
| 2011/0295879 A1 | 12/2011 | Logis et al. |
| 2012/0023418 A1 | 1/2012 | Frields et al. |
| 2012/0050197 A1 | 3/2012 | Kemmochi |
| 2012/0075337 A1 | 3/2012 | Rasmussen et al. |
| 2012/0078708 A1 | 3/2012 | Taylor et al. |
| 2012/0129347 A1 | 5/2012 | Yeom |
| 2012/0144325 A1 | 6/2012 | Mital et al. |
| 2012/0150577 A1 | 6/2012 | Berg |
| 2012/0150863 A1 | 6/2012 | Fish |
| 2012/0159347 A1 | 6/2012 | Fish |
| 2012/0159355 A1 | 6/2012 | Fish |
| 2012/0166985 A1 | 6/2012 | Friend |
| 2012/0179980 A1 | 7/2012 | Whalin et al. |
| 2012/0179981 A1 | 7/2012 | Whalin et al. |
| 2012/0233543 A1 | 9/2012 | Vagell et al. |
| 2013/0007103 A1 | 1/2013 | Braun et al. |
| 2013/0035853 A1 | 2/2013 | Stout et al. |
| 2013/0091205 A1 | 4/2013 | Kotler |
| 2013/0091465 A1 | 4/2013 | Kikin-Gil |
| 2013/0097544 A1 | 4/2013 | Parker |
| 2013/0101978 A1 | 4/2013 | Ahl et al. |
| 2013/0124978 A1 | 5/2013 | Horns et al. |
| 2013/0132886 A1 | 5/2013 | Mangini et al. |
| 2013/0154946 A1 | 6/2013 | Sakuramata et al. |
| 2013/0211980 A1 | 8/2013 | Heiferman et al. |
| 2013/0212494 A1 | 8/2013 | Heiferman et al. |
| 2013/0239002 A1 | 9/2013 | Maloney et al. |
| 2013/0246903 A1 | 9/2013 | Mukai |
| 2013/0263020 A1 | 10/2013 | Heiferman et al. |
| 2014/0033068 A1 | 1/2014 | Gupta et al. |
| 2014/0207867 A1 | 7/2014 | Kotler et al. |

(56) References Cited

U.S. PATENT DOCUMENTS

2014/0317561 A1    10/2014    Robinson et al.
2015/0127628 A1    5/2015     Rathod

FOREIGN PATENT DOCUMENTS

| | | |
|---|---|---|
| CN | 1928859 A | 3/2007 |
| CN | 1992625 A | 7/2007 |
| CN | 101689188 | 3/2010 |
| CN | 101834905 A | 9/2010 |
| EP | 1 517 260 A2 | 3/2005 |
| JP | 04-257046 A | 9/1992 |
| KR | 10-0380660 | 4/2003 |
| KR | 10-0668075 | 1/2007 |
| KR | 10-0691618 | 3/2007 |
| KR | 10-0786635 | 12/2007 |
| RU | 2005 139 793 A | 6/2007 |
| WO | 02/061682 | 8/2002 |
| WO | 2006/100475 A1 | 9/2006 |
| WO | 2007/092470 A2 | 8/2007 |

OTHER PUBLICATIONS

Greenberg et al.; "Human and Technical Factors of distributed Group Drawing Tools," Interacting with Computers 4 (1), Dec. 1992, Butterworth-Heinemann (Special edition on CSCW, Tom Rodden ed.) pp. 364-392.

"Activity Explorer: Activity-centric Collaboration from Research to Product," IBM Systems Journal, IBM®, 23 pages accessed on Feb. 3, 2009, accessed at: http://www.research.ibm.com/journal/sj/454/geyer.html.

"Aquatic Sugar: The Children's Interface, Translated for Adults," One Laptop Per Child News, Nov. 7, 2007, 5 pages.

Hupfer et al., "Introducing Collaboration into an Application Development Environment," CSCW '04, Nov. 6-10, 2004, 4 pages.

U.S. Official Action mailed Sep. 30, 2010 in U.S. Appl. No. 11/260,515, 18 pages.

U.S. Official Action mailed Feb. 24, 2011 in U.S. Appl. No. 11/260,515, 15 pages.

Little, J. Ambrose, "High-End Business Intelligence with Data Visualization with WPF 4"—Published Date: Jun. 29, 2010, http://www.codeproject.com/KB/showcase/DataVisualizationWPF4.aspx, 7 pages.

Nelson, John, "Just Around the Corner: Visual Fusion 4.5"—Published Date: Sep. 30, 2009, http://www.idsolutions.com/press_newsletter_vfx45_silverlight.aspx, 6 pages.

Hewagamage et al., "Interactive Visualization of Spatiotemporal Patterns Using Spirals on a Geographical Map"—Published Date: 1999, http://ieeexplore.ieee.org/stamp/stamp.jsp?arnumber=00795916, 8 pages.

Visualize and Map SalesForce Leads with SpatialKey—Retrieved Date: Jul. 19, 2010, http://www.spatialkey.com/support/tutorials/visualize-and-map-salesforce-leads-with-spatialkey-part-ii/, 8 pages.

Author Unknown, "GeoTime"—Retrieved Date: Jul. 19, 2010, http://www.geotime.com/Product/GeoTime-(1)/Features/---Benetifs.aspx, 7 pages.

Derthick et al., "An Interactive Visualization Environment for Data Exploration"—Published Date: Aug. 1997 http://www.cs.cmu.edu/~ sage/KDD97.html, 9 pages.

Author Unknown, "The Beginner's Guide to Data Visualization"—Retrieved Date: Jul. 21, 2010 http://www.tableausoftware.com/beginners-data-visualization, 6 pages.

Author Unknown, "An Overview of Aabel 3 Features"—Retrieved Date: Jul. 21, 2010 http://www.gigawiz.com/Aabel.html, 19 pages.

Author Unknown, "Create treemaps using easy drag and drop interactions"—Retrieved Date: Jul. 21, 2010 http://www.magnaview.nl/treemap/, 1 page.

Thomas et al., "Through-Walls Collaboration"—Published Date: 2009, http://ieeexplore.ieee.org/stamp/stamp.jsp?tp=&arnumber=5165559, 8 pages.

Author Unknown, "Collaboration within the Telepresence Experience"—Published Date: Jan. 2010, http://www.wrplatinum.com/Downloads/11056.aspx, 11 pages.

Moran et al., "Tailorable Domain Objects as Meeting Tools for an Electronic Whiteboard"—Published Date: 1998 http://www.fxpal.com/people/chiu/paper-mvc-CSCW98.pdf, 10 pages.

Izadi et al., "Dynamo: A public interactive surface supporting the cooperative sharing and exchange of media"—Published Date: Apr. 2007 http://hci.stanford.edu/publications/2007/range-wip-final.pdf, 10 pages.

Fernando et al., "Narrowcasting Attributes for Presence Awareness in Collaborative Virtual Environments"—Published Date: 2006 http://ieeexplore.ieee.org/stamp/stamp.jsp?tp=&arnumber=4019930, 6 pages.

Author Unknown, "The Platinum Experience of Collaboration"—CollaboratorHYPERMAX—Retrieved Date: Jul. 16, 2010, http://www.businessoctane.com/group_telepresence.php, 7 pages.

Office Action mailed Dec. 11, 2009, in U.S. Appl. No. 11/260,515, 20 pages.

Office Action mailed Feb. 4, 2011, in U.S. Appl. No. 12/184,174, 19 pages.

Office Action mailed Sep. 6, 2011, in U.S. Appl. No. 12/184,174, 25 pages.

Office Action mailed Mar. 13, 2012, in U.S. Appl. No. 12/184,174, 20 pages.

Office Action mailed Jun. 4, 2012, in U.S. Appl. No. 12/965,965, 23 pages.

Office Action mailed Nov. 8, 2012, in U.S. Appl. No. 12/965,965, 14 pages.

Office Action mailed Nov. 20, 2012, in U.S. Appl. No. 12/184,174, 25 pages.

Office Action mailed Aug. 12, 2013, in U.S. Appl. No. 13/272,832, 18 pages.

International Search Report mailed Nov. 30, 2009, in PCT Application No. PCT/US2009/046529.

EP Supplemental Search Report mailed Jul. 7, 2011, in EP Application No. 09803312.9.

Chinese Office Action dated Aug. 31, 2012 in Appln No. 200980131157.5.

Chinese Second Office Action dated Jan. 30, 2013 in Appln No. 200980131157.5.

Chinese Third Office Action dated Jul. 23, 2013 in Appln No. 200980137757.5, 8 pgs.

Adams et al., "Distributed Research Teams: Meeting Asynchronously in Virtual Space", Institute of Electrical and Electronics Engineers (1999), 17 pages.

"Adobe Connect", Retrieved from: <http://www.adobe.com/acom/connectnow/> on Oct. 11, 2010, (Sep. 16, 2010), 3 pages.

"Adobe ConnectNow", Retrieved from: <http://www.adobe.com/acom/connectnow/> on Oct. 13, 2010, (2010), 6 pages.

Bell, David et al., "Sensory Semantic User Interfaces (SenSUI) (position paper)", Fluidity Research Grouo: Brunei Universitv. (Oct. 20, 2009), 14 pages.

Bunzel, Tom "Using Quindi Meeting Capture", retrieved from http://www.informit.com/guides/content.as[2x?g=msoffice&segNum=220, (Sep. 1, 2006), 3 pages.

Cathy, et al., "Mindshift Innovation", Oct. 4, 2007, 2 pages.

"Cisco Context-Aware Mobility Solution: Presence Applications", retrieved from https://www.cisco.com/en/US/solutions/collateral/ns340/ns394/ns348/ns788/brochure c22-497557.html on Sep. 7, 2010, 5 pages.

"CounterPoint: A Zooming Presentation Tool"; http://web.archive.org/web/20050205082738/www.cs.umd.edu/hcil/counterpoint/, Archive.org 2005 Capture, 3 pgs.

"Datapoint". Version 1.1, 1997-2007, FileDudes.com, 2 pages.

"Description for SharePoint Meeting Manager", Retrieved from: <http://www.softpicks.net/software/Business/Project-Managemen/SharePoint-Meeting-Manager-47146.htm> on Oct. 11, 2010 (Jul. 27, 2009), 2 pages.

"Free PhotoMesa 3.1.2 (Windows)", retrieved on Dec. 28, 2007 at <<http://www.windsorinterfaces.com/ photomesa.shtml>>, Windsor Interfaces Inc., 3 pages.

(56) References Cited

OTHER PUBLICATIONS

Fruchter, Renate "Brick & Bits & Interaction (BBI)", http://www.ii.ist.i.kyotou.ac.io/sid/sid2001/oaoers/oositions/bricksbitsinteraction.odf (2001), 4 pages.

Gallegos, D., et al. "CounterPoint User Manual" class project for Charles Paine at the University of New Mexico, Downloaded from Archive. Org 2005 capture, http://web.archive.org/web/20050205082738/www.cs.umd.edu/hcil/counterpoint/, 21 pgs.

Good et al. (2001) "CounterPoint: Creating Jazzy Interactive Presentations"; HCIL Tech Report #2001-03, University of Maryland, College Park, MD 20742, 9 pgs.

"GoToMeeting", Retrieved from: <httQ://www.gotomeeting.com/fec/online meeting> on Oct. 11, 2010, 1 page.

Grass Roots Software; "FREEPATH-EDU Nonlinear Presentation Software"; http://www.fullcompass.com/product/233150.html; 3 Pgs.

Ionescu, Arna et al., "Workspace Navigator: Tools for Capture, Recall and Reuse using Spatial Cues in an Interactive Workspace", Stanford Technical Re[2ort TR2002-04 htto://bci.stanford.edu/research/wksocNavTR.odf (2002), 16 pages.

Ju, Wendy et al., "Where the Wild Things Work: Capturing Shared Physical Design Workspaces"; Stanford University, CSCW '04, Nov. 601-, 9 pgs.

Kang, et al. Effects of Lateral Charge Spreading on the Reliability of TANOS (TaN/AlO/SiN/Oxide/Si) NAND Flash Memo, IEEE 45th Annual International Reliability Physics Conference, Phoenix, AZ, 4 pgs.(2007).

Karlson, et al., "Courier: A Collaborative Phone-Based File Exchange System"; Retrieved at << http://docs.google.com/viewer?a=v&q=cache"Mb2OKecuT1kj:citeseerx.ist.psu.edu/viewdoc/download%3Fdoi%3D10.1.1.146.360%26rep%3Drep1%26type% 3Dpdf= collaborative=document=navigation=visual=display=participant= device&hl=en&pid=blsrcid=ADGEESgArWqUU1B_ J2heHCEm78A3YhBLNjwOrzUuQeMSHPm8FebYGzDX9mSFKGC 6RLq1, dated Jan. 2008.

Kim, Hyun H., et al., "SmartMeeting: CMPT 481/811 Automatic Meeting Recording System", http://www.cs.usask.ca/grads/hyk564/homePage/811/CM PT%20811 %20final.doc, (2004),7 pages.

Lai, et al. Fluorinated ALD Al2O3 Gate Dielectrics by CF4 Plasma, IEEE Semiconductor Device Research Symposium (2 pages) (2005).

Lai, et al. Fluorine Effects on the Dipole Structures of the Al2O3 Thin Films and Characterization by Spectroscopic Ellipsometry, Appl Phys Lett 90, 172904-1-172904-3 (4 pages including cover page) (2007).

Lai, et al. Study of the Erase Mechanism of MANOS (Metal/Al2O3/SiN/SiO2/Si) Device, IEEE Elec Dev Lett 28,643-646 (4 pages) (2007).

Lee, et al. A Novel SONOS Structure of SiO2/SiN/Al2O3 with TaN Metal Gate for Multi-Giga Bit Flash Memories, IEDM '03 Technical Digest, 26.5.1-26.5.4 (4 pages) (2003).

Lu, et al. Non-Volatile Memory Technology—Today and Tomorrow, Keynote Address, Proceedings of the 13th IPFA, Singapore (6 pages) (2006).

"Meet mimio—The Digital Meeting Assistant", Mayflower Business Systems Limited; http://www.kda.co.uk/mimio1/whiteQaQer.html, (May 1999), 10 pages.

"Meeting Center Using Video in Your Meetings"; Retrieved at <<http://www.oucs.ox.ac.uk/webex/Windows/Video.pdf>>, May 13, 2009, 2 pgs.

"Meeting Management Software", Thinking Faster: Ideas, tools and processes to improve personal, workgroup and enterprise productivity and innovation; Retrieved from: <http://workingsmarter.typepad.com/my weblog/2004/12/meeting managem. html> on Oct. 11, 2010, (Dec. 10, 2004), 2 pages.

"Microsoft Office Communicator 2007 Getting Started Guide", retrieved from http://www.ittdublin.ie/media/Media 22233en.odf (Jul. 2007), 77 pages.

"Microsoft® Office Live Meeting Feature Guide", Microsoft Corporation, Available at <http://download. microsoft.com/download/8/0/3/803f9 ba6-5e 12-4b40-84d9-d8a91073e3dc/LiveMeeting.doc>,(Jan. 2005), 17 pgs.

Mitrovic, Nikola et al., "Adaptive User Interface for Mobile Devices", retrieved from http://citeseerx.ist.pssu.edu/viewdoc/download?doi= 10.1.1.140.4996&rep=rep1 &type=pdf. (2002), 15 pages.

"Online Calendar & Group Scheduling": MOSAIC Technologies, retrieved from ,http://www.webexone.com/Brandded/ID.asp?brandid= 2348&pg=%20AppCalendar. On Apr. 29, 2009, 4 pgs.

Peddemors, A.J.H. et al., "Presence, Location and Instant Messaging in a Context-Aware Application Framework",retrieved from htt://citeseerx.ist.psu.edu/viewdoc/download?doi=10.11.1.98.3321 &rep=rep1 &type=pdf; 4th International Conference on Mobile Data Management MDM (2003),6 pages.

Photodex Corporation; "ProShow Producer Feature Overview"; http://www.photodex.com/products/producer/features.html; 2008; 2 Pgs.

Rudnicky, Alexander I., et al., "Intelligently Integrating Information from Speech and Vision to Perform Light-weight Meeting Understanding", retrieved from http://citesseerx.ist.psu.edu/viewdoc/download?doi=10.1.1.126.1733&rep=rep1 &type=pdf. (Oct. 2005), 6 pages.

Shaw, "Create Pan and Zoom Effects in PowerPoint", 2007, Microsoft Corporation, 10 pages.

Watson, Richard "What is Mobile Presence?", Retrieved from http://reseller.tmcnet.com/topics/unified-communications/articles/54033-what-mobile-presence.htm, (Apr. 10, 2009), 4 pages.

Wempen, F., "PowerPoint 2007 Bible"; Feb. 27, 2007, John Wiley & Sons, 27 pgs. Excerpt.

Werle, et al., "Active Documents Supporting Teamwork in a Ubiquitous Computing Environment"; Retrieved at <<http://docs.google.com/viewer?a=v&q=cache:iyt-5ZWZURYJ:citeseerx.ist.osu.edu/viewdoc/download%3Fdoi%3D10.1.1.157.4661%26rep%3Drep1% 26type% 3Dpdf=smart=layout=document=confeence=meeting= where=participant=is=within=the=document&hl=en&pid=bl&srcid= ADGEEShcctdCPK5oM1kGncxGqgHps9wl1DPOjAHtQXOxazPZlSh Lb_4JN55Ity2X, 4 pgs.

Weverka, "PowerPoint 2007 All-in-One Desk Reference for Dummies" Jan. 2007, Published by Wiley Publishing, 8 pgs.

Yu, Shoou-Jong et al., "Who Said What When? Capturing Important Moments of a Meeting", retrieved from http://repository.cmu. edu/cgi/viewcontent.cgi?article= 1003&context=silicon valley; Technical Report, (Apr. 10-15, 2010),7 pages.

Zenghong, Wu et al., "Context Awareness and Modeling in Self-Adaptive Geo-Information Visualization", retrieved from http://icaci.org/documents/ICC_proceedings/ICC2009/html/refer/17_1.pdf on Aug. 30, 2010, 13 pages.

ZuiPrezi Ltd.; "ZuiPrezi Nonlinear Presentation Editor"; http://zuiprezi.kibu.hu/; 2007; 2 Pgs.

Office Action mailed Mar. 3, 2009, in U.S. Appl. No. 11/260,515.

U.S. Office Action mailed Apr. 11, 2013 in U.S. Appl. No. 13/253,886, 14 pages.

Office Action mailed Sep. 25, 2013, in U.S. Appl. No. 12/184,174, 34 pages.

Chinese Fourth Office Action dated Nov. 21, 2013 in Appln No. 200980137757.5, 11 pgs.

Office Action mailed May 19, 2011, in U.S. Appl. No. 12/473,206, 30 pages.

Office Action mailed Dec. 7, 2011, in U.S. Appl. No. 12/473,206, 37 pages.

Office Action mailed Jul. 23, 2012, in U.S. Appl. No. 12/968,332, 30 pages.

Office Action mailed Aug. 1, 2013, in U.S. Appl. No. 12/968,332, 23 pages.

Office Action mailed Dec. 5, 2013, in U.S. Appl. No. 12/968,332.

Office Action mailed Dec. 20, 2013, in U.S. Appl. No. 12/965,965.

Office Action mailed Dec. 30, 2013, in U.S. Appl. No. 13/272,832.

Notice of Allowance Received for Russian Federation Patent Application No. 2011103151, dated Sep. 4, 2013, filed Jun. 7, 2009, 18 Pages.

Office Action dated Feb. 14, 2014, in U.S. Appl. No. 13/253,886, 26 pgs.

Office Action dated Mar. 27, 2014, in U.S. Appl. No. 12/968,287, 41 pgs.

Chinese Fifth Office Action dated May 30, 2014 in Appln No. 200980131157.5, 9 pgs.

(56) References Cited

OTHER PUBLICATIONS

Chinese Office Action dated Nov. 2, 2014 in Appln No. 201210376181.9, 16 pgs.
Office Action dated Jun. 5, 2014, in U.S. Appl. No. 12/965,965.
Office Action dated Oct. 31, 2014, in U.S. Appl. No. 13/272,832, 17 pgs.
Office Action dated Dec. 4, 2014, in U.S. Appl. No. 13/271,148, 56 pgs.
Office Action dated Jan. 6, 2015, in U.S. Appl. No. 13/253,886, 43 pgs.
Office Action dated Jul. 17, 2014, in U.S. Appl. No. 12/968,332, 34 pgs.
Office Action dated Jul. 18, 2014, in U.S. Appl. No. 14/225,234, 25 pgs.
Office Action dated Jul. 31, 2014, in U.S. Appl. No. 12/473,206, 81 pgs.
Office Action dated Aug. 11, 2014, in U.S. Appl. No. 12/184,174, 50 pgs.
Office Action dated Aug. 14, 2014, in U.S. Appl. No. 13/253,886, 17 pgs.
Chinese Office Action dated Feb. 3, 2015 in Appln No. 201210382816.6, 13 pgs.
Chinese Office Action dated Apr. 3, 2015 in Appln No. 201210376206.5, 15 pgs.
Chinese Second Office Action Issued in Patent Application No. 201210376206.5, dated Jun. 10, 2015, 10 Pages.
"Microsoft Word's Click and Type Feature", published by SnipTools, Nov. 12, 2003 downloaded Jun. 28, 2015 from http://sniptools.com/vault/microsoft-words-click-and-type-feature.
Office Action dated Mar. 10, 2015, in U.S. Appl. No. 14/225,234, 30 pgs.
Office Action dated Apr. 20, 2015, in U.S. Appl. No. 14/272,832, 66 pgs.
Office Action dated Jul. 7, 2015, in U.S. Appl. No. 12/184,174, 34 pgs.
Office Action dated Jul. 9, 2015, in U.S. Appl. No. 13/253,886, 18 pgs.
Office Action dated Jul. 17, 2015, in U.S. Appl. No. 13/271,148, 22 pgs.
Chinese Second Office Action Issued in Patent Application No. 201210376181.9, dated Jul. 13, 2015, 13 Pages.
Office Action dated Oct. 2, 2014, in U.S. Appl. No. 12/965,965, 17 pgs.
Office Action dated Oct. 9, 2014, in U.S. Appl. No. 12/968,332, 28 pgs.
Office Action dated Mar. 11, 2015, in U.S. Appl. No. 12/965,965, 22 pgs.
Notice of Allowance dated Apr. 10, 2015, in U.S. Appl. No. 12/968,332, 20 pgs.
Chinese Third Office Action dated Oct. 28, 2015 in Appln No. 201210376206.5, 3 pgs.
Office Action dated Oct. 8, 2015, in U.S. Appl. No. 14/225,234, 22 pgs.
"Office Action Issued in Chinese Patent Application No. 201210376181.9", dated Aug. 17, 2016, 12 Pages.
Chinese Decision on Reexamination dated Dec. 5, 2016, in Application 201210376181.9, 17 pages. (No English Translation).
Chinese Notice of Reexamination dated Dec. 7, 2016, in Appln. No. 201210376206.5, 10 pages.
Decision on Reexamination Issued in Chinese Patent Application No. 201210376206.5, dated Jun. 1, 2017, 18 pages.
Notice of Allowance Issued in Chinese Patent Application No. 201210376181.9, dated Mar. 1, 2017, 4 pages.
"The Screen Capture Tool" by Help and Manual, archived Mar. 13, 2006 by the Internet Wayback Machine, downloaded Nov. 28, 2016 from https://web.archive.org/web/20060313150929/http://www.helpandmanual.com/help/help_toc.html?hm_advanced_tools_capture.
Non-Final Office Action dated Jul. 18, 2014, in U.S. Appl. No. 14/225,234, 5 pages.
Notice of Allowance dated Aug. 10, 2016, in U.S. Appl. No. 13/253,886, 22 pgs.
Office Action dated Oct. 6, 2016, in U.S. Appl. No. 14/225,234, 11 pgs.
Advisory Action dated Feb. 7, 2017, in U.S. Appl. No. 14/225,234, 3 pgs.
Office Action dated Jun. 5, 2017, in U.S. Appl. No. 14,225,234, 11 pages.
Office Action dated Jan. 15, 2016, in U.S. Appl. No. 13/253,886, 14 pgs.
Office Action dated Jun. 17, 2016, in U.S. Appl. No. 14/225,234, 15 pgs.
"Office Action Issued in Chinese Patent Application No. 201210376206.5", dated Mar. 9, 2016, 9 Pages.
Chinese Final Rejection Received for Chinese Patent Application No. 201210376181.9, dated Jan. 20, 2016, 14 Pages.
Office Action in European Application No. 09803312.9 dated Dec. 6, 2017, 7pgs.
Office Action dated Jan. 11, 2018, in U.S. Appl. No. 13/272,832, 16 pgs.
Notice of Allowance dated Feb. 12, 2018, U.S. Appl. No. 13/271,148, 7 pages.

* cited by examiner

SHARED COLLABORATION CANVAS

BACKGROUND

Enterprises frequently employ teams of people to carry out specific tasks. In such circumstances, members of a team create files associated with a specific task. Each of the team members may review, edit, or otherwise interact with the files associated with the specific task. For example, each of the team members can interact with a slide show file to develop their sections of a presentation.

Team members frequently work on files associated with a specific task at the same time. For this reason, team members can quickly become confused about the files with which other team members are interacting. In addition, team members can quickly become confused about what other team members are doing with the files. Such confusion may be especially pronounced when team members are not located in the same geographic location.

SUMMARY

A computing system causes a plurality of display devices to display user interfaces containing portions of a canvas shared by a plurality of users. The canvas is a multidimensional graphical space. Discrete graphical elements can be located at arbitrary locations within the canvas. Each of the discrete graphical elements graphically represents a discrete resource. When a user interacts with a resource in the set of resources, the computing system modifies the canvas to include an interaction element graphically indicating that the user is interacting with the resource. The computer system then causes the display devices to update the user interfaces such that the user interfaces reflect a substantially current state of the canvas. In this way, the users may be able to understand which ones of the users are interacting with which ones of the resources.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

As briefly described above, this disclosure is directed to a computing system that provides a canvas shared by a plurality of users. The techniques of this disclosure are described with reference to the attached figures. It should be appreciated that the attached figures are provided for purposes of explanation only and should not be understood as representing a sole way of implementing the techniques of this disclosure.

Figure 1:
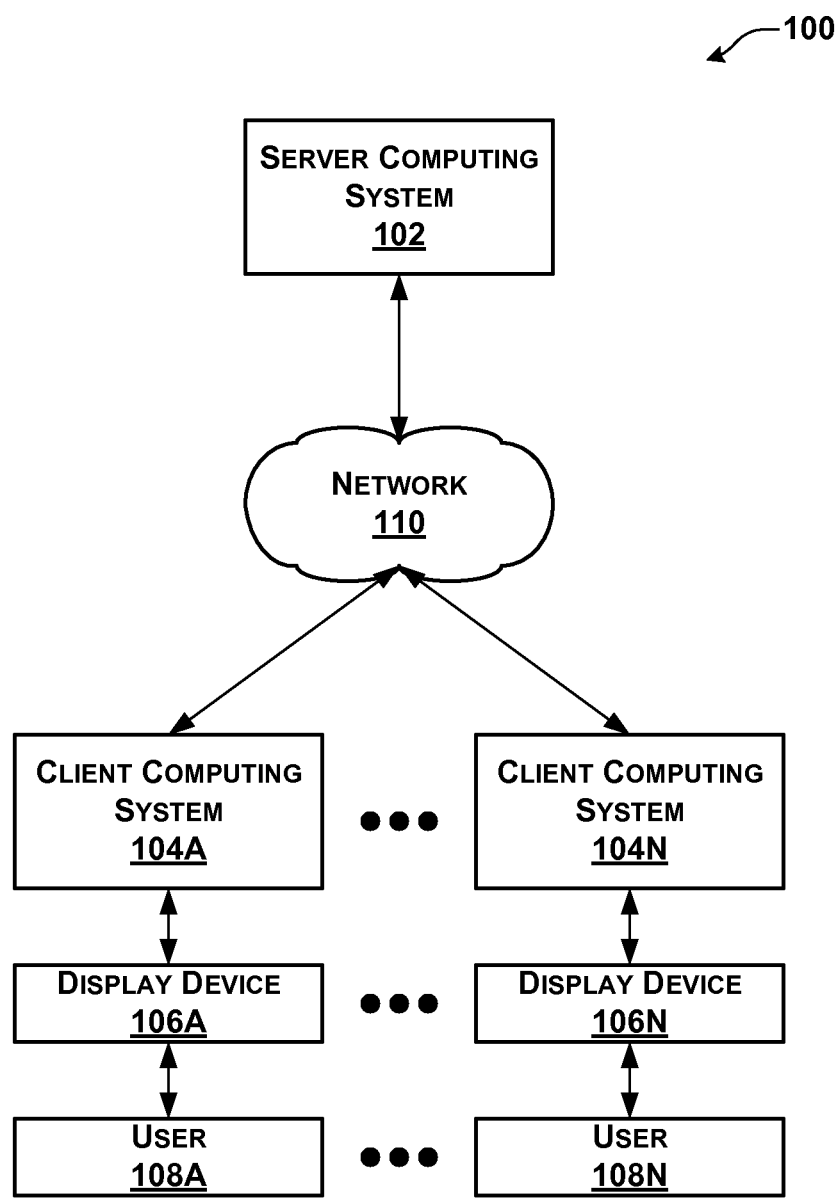
FIG. 1 is a block diagram illustrating an example collaboration system in which a canvas is shared by a plurality of users.

FIG. 1 is a block diagram illustrating an example collaboration system 100 in which a canvas is shared by a plurality of users. As described in detail below, the collaboration system 100 enables a plurality of users to collaborate on a set of resources.

The collaboration system 100 includes a server computing system 102. The server computing system 102 is an electronic computing system. As used in this disclosure, an electronic computing system is a set of one or more physical electronic computing devices. An electronic computing device is a physical machine that comprises physical electronic components. Electronic components are physical entities that affect electrons or fields of electrons in a desired manner consistent with the intended function of an electronic computing device. Example types of electronic components include capacitors, resistors, diodes, transistors, and other types of physical entities that affect electrons or fields of electrons in a manner consistent with the intended function of an electronic computing device. An example physical computing device is described below with reference to FIG. 5.

In addition, the collaboration system 100 includes a plurality of client computing systems 104A-104N (collectively, "client computing systems 104"). Each one of the client computing systems 104 is an electronic computing system. Each one of the client computing systems 104 is communicatively connected to one of display devices 106A-106N (collectively, "display devices 106"). As used in this disclosure, a display device is a device capable of dynamically displaying visible images. Example types of display devices include computer monitors, televisions, light-emitting diode (LED) arrays, liquid crystal display (LCD) screens, plasma screens, cathode ray tube (CRT) screens, and other types of devices capable of dynamically displaying visible images.

A plurality of users 108A-108N (collectively, "users 108") interact with respective ones of the client computing systems 104. Each of the users 108 is an individual human being. The users 108 may be using the client computing systems 104 on behalf of one or more enterprises. As used in this disclosure, an enterprise is a natural or legal entity. Example types of legal entities include corporations, partnerships, proprietorships, companies, non-profit corporations, foundations, estates, governmental agencies, and other types of legal entities. The users 108 may interact with the client computing systems 104 in a variety of ways. For example, the users 108 may use input devices, such as keyboards or mice, directly connected to the client computing systems 104 to interact with the client computing systems 104. In another example, the users 108 may interact with the client computing systems 104 by interacting with computing systems (not shown) that communicate with the client computing systems 104.

The users 108 may be associated with one another in a variety of ways. For example, each of the users 108 may be assigned to work on a project. As used in this disclosure, a project is a planned undertaking of an enterprise to achieve a specific goal. Example projects include modernizing a web site, establishing an office in a new city, litigating a lawsuit, executing a pharmaceutical trial, constructing a building, and other types of planned undertakings to achieve specific goals. In a second example, each of the users 108 may be individuals having access to a document collection. As used in this disclosure, a document collection is a structured set of documents. In a third example, each of the users 108 is linked to a first one of the users 108 in a social networking service.

A network 110 facilitates communication between the server computing system 102 and the client computing systems 104. The network 110 may be a wide variety of different types of electronic communication network. For example, the network 110 may be a wide-area network, such as the Internet, a local-area network, a metropolitan-area network, or another type of electronic communication network. The network 110 may include wired and/or wireless data links. A variety of communications protocols may be used in the network 110 including, but not limited to, Ethernet, Transport Control Protocol (TCP), Internet Protocol (IP), Hypertext Transfer Protocol (HTTP), SOAP, remote procedure call protocols, and/or other types of communications protocols.

As described in detail below, the server computing system 102 stores a canvas shared by the users 108. As used in this disclosure, a canvas is a multidimensional graphical space. Furthermore, as used in this disclosure, a graphical space is a logical coordinate system in which relative locations of graphical elements are defined in two or more dimensions. As used in this disclosure, a graphical element is a graphical image having a finite spatial size. Example types of graphical elements include 2-dimensional icons, 2-dimensional static images, 2-dimensional animated images, 3-dimensional static images, 3-dimensional animated images, and other types of graphical images having finite spatial sizes. In some example implementations, the canvas is an infinite canvas. As used in this disclosure, an infinite canvas is a graphical space in a logical coordinate system within which relative locations of graphical elements are defined in two or more dimensions, at least one of which is conceptually infinite. A conceptually infinite dimension is a dimension that conceptually has no upper and/or lower limit.

Because graphical elements have finite spatial sizes, the relative locations of graphical elements within a canvas can be defined using the logical coordinate system of the canvas. For example, the location within a 2-dimensional canvas of a first graphical element can be defined by the coordinates (5, 10) and a second graphical element can be defined by the coordinates (−8, 84). In this example, the coordinates (5, 10) may indicate that the first graphical element is located five units to the right of an origin point of the canvas and ten units above the origin point of the canvas. Similarly, in this example, the coordinates (−8, 84) may indicate that the second graphical element is located eight units to the left of the origin point of the canvas and eighty-four units above the original point of the canvas.

A plurality of resources is associated with the canvas. Each resource associated with the canvas is graphically represented by a graphical element in the canvas. As used in this disclosure, a resource is any real or virtual thing having an identity. Example types of resources include electronic files, electronic folders, physical documents, people, buildings, files, computers, software applications, and other real or virtual things having identities.

The resources associated with the canvas may be related in a variety of ways. For example, each resource associated with the canvas may be associated with a project. In this example, the resources associated with the canvas may include the people assigned to work on the project, the electronic files generated during the project, and physical equipment allocated for use on the project. In another example, the resources associated with the canvas include a set of people on a team and each of the electronic files stored in a team document collection.

As described in detail below, the server computing system 102 is configured to perform an operation that causes the display devices 106 to display user interfaces containing portions of the canvas. Each of the display devices 106 can display a different portion of the canvas. As used in this disclosure, a portion of a canvas is a contiguous graphical subspace within the canvas. For example, assuming that the canvas is a 2-dimensional canvas, the display device 106A may display a rectangular portion of the canvas having a lower-left corner at coordinates (100, 50) and an upper-right corner at coordinates (200, 150) and the display device 106N may display a rectangular portion of the canvas having a lower-left corner at coordinates (125, 75) and an upper-right corner at coordinates (225, 175).

The users 108 are able to interact with the client computing systems 104 to change the portions of the canvas displayed by the display devices 106. For example, the canvas is a 2-dimensional canvas and the display device 106A displays a rectangular portion of the canvas having a lower-left corner at coordinates (100, 50) and an upper-right corner at coordinates (200, 150). In this example, the user 108A interacts with the client computing system 104A to change the portion of the canvas displayed by the display device 106A such that the portion of the canvas has a lower-left corner at coordinates (125, 60) and an upper-right corner at coordinates (225, 160). In another example in which the canvas is a 2-dimensional canvas, the users 108 may change the portions of the canvas displayed by the display devices 106 to zoom in or zoom out. The users 108 may change the portions of the canvas displayed by the display devices 106 in a variety of ways. For example, the user 108A may change the portions of the canvas displayed by the display device 106A by positioning a mouse cursor over the portion of the canvas, depressing a mouse button, moving the mouse, and releasing the mouse button when the display device 106A displays a desired portion of the canvas. When the users 108 change the portions of the canvas displayed by the display devices 106, the client computing systems 104 send view change input to the server computing system 102. The view change input indicates a portion of the canvas that a user wants to see.

In some example implementations, the server computing system 102 automatically modifies the canvas such that the graphical elements representing the users 108 are located at locations within the canvas corresponding to the portions of the canvas that the display devices 106 are displaying to the users 108. For example, the server computing system 102 may automatically modify the canvas such that the graphical elements representing the users 108 are located at locations within the canvas corresponding to the lower-left corners of the portions of the canvas that the users 108 are currently viewing. In this example, the display device 106A may be currently displaying a portion of the canvas having a lower-left corner at coordinates (30, 90). In this example, the server computing system 102 automatically modifies the canvas such that the graphical element representing the user 108A is located at a location having coordinates (30, 90).

The users 108 may interact with resources associated with the canvas. How one of the users 108 interacts with a resource in the set of resources may vary depending on the type of the resource. For example, the users 108 may interact with word processor documents by opening the word processor documents in a word processing application and editing the word processor documents. In a second example, the users 108 may interact with slide show documents by opening the slide show documents in a slide show application and editing or displaying slide shows. In a third example, the users 108 may interact with other ones of the users 108 by opening a communication application and engaging in a communication session using the communication application. Example types of communication sessions may include voice communication sessions (i.e., telephone calls), instant messenger sessions, videoconferences, web conferencing sessions, and so on.

When the users 108 want to start interacting with target resources in the set of resources, the users 108 provide input to the client computing systems 104 indicating the target resources. As used in this disclosure, a user who caused the server computing system 102 to receive input is referred to as the user who originated the input. The target resources are the resources with which the users 108 desire to interact. The users 108 may provide input to the client computing systems 104 indicating the target resources in a variety of ways. For example, the user 108A may provide input to the client computing system 104A indicating that the user 108A wants to interact with a target resource by double-clicking on a graphical element in the canvas representing the target resource. In response to receiving the input indicating that the users 108 want to interact with the target resources, the client computing systems 104 send interaction input to the server computing system 102 via the network 110. The interaction input indicates the target resources.

In response to receiving interaction input from one of the client computing systems 104, the server computing system 102 sends back to the client computing system information needed to open a target resource indicated by the resource interaction input. The information needed to open a resource may vary depending on the type of the resource. For example, if the resource is a word processing document, the server computing system 102 sends back a copy of the word processing document. In another example, if the resource is another one of the users 108, the server computing system 102 may send back a connection string that indicates to the client computing system how to set up a communication session with the other user. For instance, the server computing system 102 may send back a telephone number of the other user.

Furthermore, in response to receiving the interaction input, the server computing system 102 modifies the canvas to include an interaction indicator. The interaction indicator is a graphical element that graphically indicates a relationship between a graphical element representing a user and a graphical element representing a target resource. In this way, the interaction indicator graphically indicates that the user is currently interacting with the target resource. In a first example implementation, the interaction indicator comprises a line connecting the graphical element representing the user and the graphical element representing the target resource. In this first example implementation, the interaction indicator may also comprise a border around the graphical element representing the user and the graphical element representing the target resource. In a second example implementation, the interaction indicator comprises a shape that encompasses the graphical element representing the user and the graphical element representing the target resource. In this second example implementation, the shape may be a rectangle, cube, oval, dodecahedron, octagon, or another type of two or three dimensional shape.

As mentioned above, the server computing system 102 causes the display devices 106 to repeatedly update the user interfaces such that the user interfaces reflect a substantially current state of the canvas. As used in this disclosure, the state of the canvas is the graphical elements in the canvas and the locations within the canvas of the graphical elements at a single given time. The current state of the canvas is the graphical elements in the canvas and the locations within the canvas of the graphical elements at the current time. Because of processing and transmission delays, it may not be possible for the user interfaces to reflect the exact current state of the canvas. Hence, the server computing system 102 may only be able to update the user interfaces such that the user interfaces reflect a state of the canvas at about the current time (i.e., the substantially current state of the canvas). As used in this disclosure, a user interface reflects a state of a canvas when, for each graphical element located within a displayed portion of the canvas at a given time, the user interface displays the graphical element at the graphical element's location within the canvas at the given time.

Because the server computing system 102 causes the display devices 106 to repeatedly update the user interfaces such that the user interfaces reflect a substantially current state of the canvas, if the display device 106A displays a portion of the canvas containing both a graphical element representing the user 108N and a graphical element representing a resource, the display device 106A starts displaying an interaction indicator indicating that the user 108N is interacting with the resource when the user 108N starts interacting with the resource. In this way, the user 108A is able to know that the user 108N is currently interacting with the resource.

When the users 108 want to stop interacting with target resources associated with the canvas, the users 108 provide input to the client computing systems 104 indicating that the users 108 want to stop interacting with the target resources. In response to receiving input indicating that the users 108 want to stop interacting with the target resources, the client computing systems 104 send interaction termination input to the server computing system 102 via the network 110. The interaction termination input indicates the target resources.

In response to receiving interaction termination input from one of the client computing systems 104, the server computing system 102 modifies the canvas to remove an interaction indicator indicating that a user of the client computing system is currently interacting with a target resource. Because the server computing system 102 causes the display devices 106 to repeatedly update the user interfaces, the interaction indicator disappears from the user interfaces. In this way, the users 108 are able to know that the user is no longer interacting with the target resource.

Figure 2:
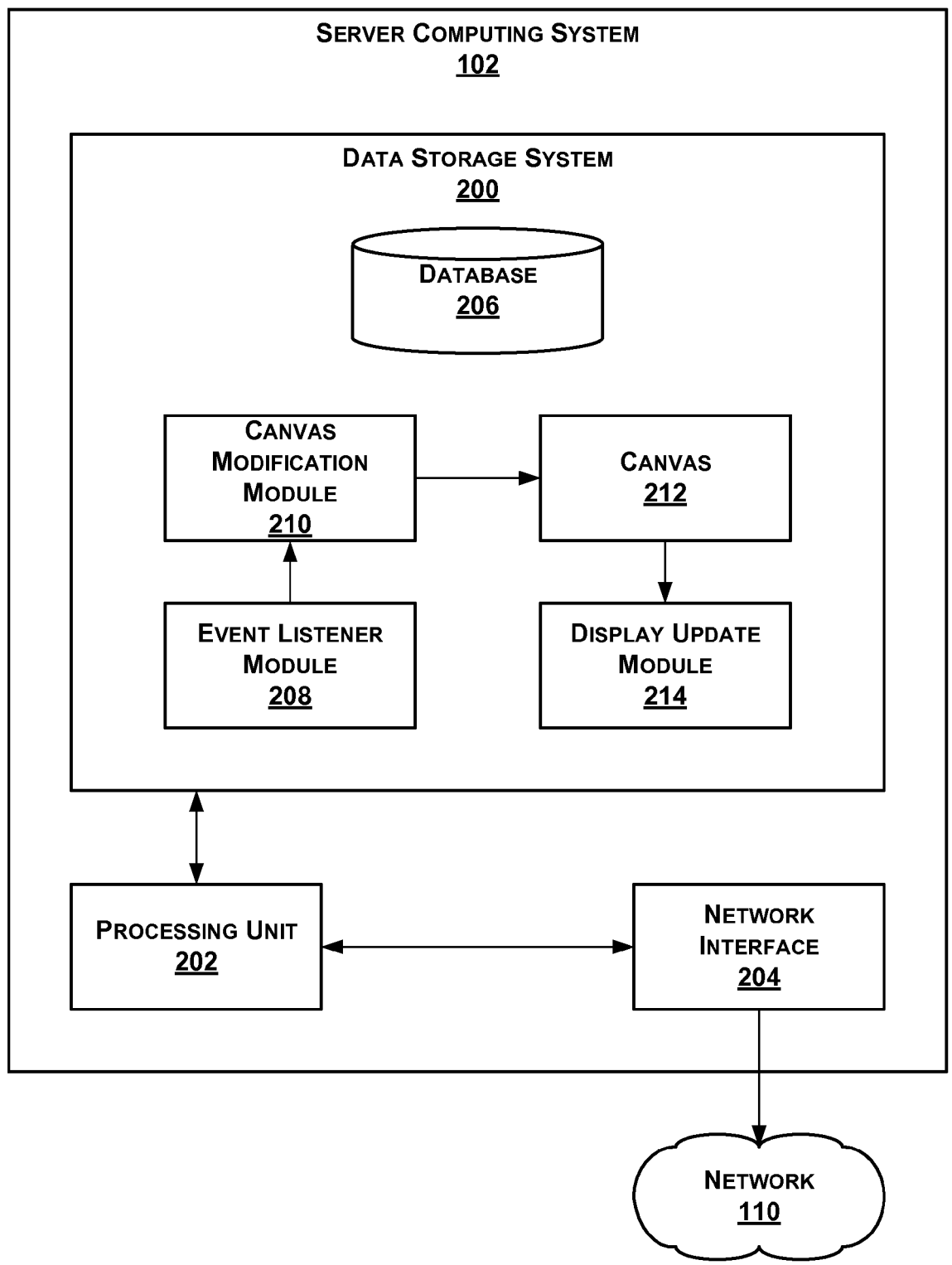
FIG. 2 is a block diagram illustrating example details of a server computing system.

FIG. 2 is a block diagram illustrating example details of the server computing system 102. It should be appreciated that FIG. 2 is provided for purposes of explanation only. In other implementations, the server computing system 102 may be implemented with a different configuration of logical components.

As illustrated in the example of FIG. 2, the server computing system 102 comprises a data storage system 200. The data storage system 200 is a data storage system. As used in this disclosure, a data storage system is a set of at least one physical computer-readable data storage medium. A computer-readable data storage medium is a physical article of manufacture that is capable of storing computer-readable data. Example types of computer-readable data storage media include hard disk drives, flash memory units, random access memory (RAM) modules, read-only memory (ROM) modules, CD-ROM discs, Digital Versatile Disc (DVD) ROM discs, BluRay discs, magnetic tape, floppy disks, and other articles of manufacture that are capable of storing computer-readable data. Example types of computer-readable data include software instructions, documents, digital images, data structures, and other types of data that can be read by a computer. As used in this disclosure, a software instruction is a data structure that represents an operation of a processing unit. For example, a software instruction may be a data structure comprising an operation code and zero or more operand specifiers. In this example, the operand specifiers may specify registers, memory addresses, or literal data. Execution of a software instruction by a processing unit of a computing system causes the computing system to perform the operation represented by the software instruction.

Furthermore, in the example of FIG. 2, the server computing system 102 comprises a processing unit 202. The processing unit 202 is a processing unit. As used in this disclosure, a processing unit is a set of at least one physical integrated circuit that executes software instructions.

In the example of FIG. 2, the server computing system 102 also comprises a network interface 204. The network interface 204 is a set of one or more network interface cards. As used in this disclosure, a network interface card is a computer hardware component designed to allow an electronic computing device to communicate over a computer network. The network interface 204 enables the server computing system 102 to send data on the network 110 and to receive data from the network 110. In some example implementations, the network interface 204 may store data received from the network 110 directly into the data storage system 200 and read data directly from the data storage system 200.

In the example of FIG. 2, the data storage system 200 stores a database 206, an event listener module 208, a canvas modification module 210, a canvas 212, and a display update module 214. The event listener module 208 comprises a set of software instructions. For ease of explanation, this disclosure includes statements that describe the event listener module 208 performing actions. Such statements should be understood to mean that when the software instructions of the event listener module 208 are executed by the processing unit 202, the server computing system 102 performs the actions. The canvas modification module 210 also comprises a set of software instructions. For ease of explanation, this disclosure includes statements that describe the canvas modification module 210 performing actions. Such statements should be understood to mean that when the software instructions of the canvas modification module 210 are executed by the processing unit 202, the server computing system 102 performs the actions. The display update module 214 also comprises a set of software instructions. For ease of explanation, this disclosure includes statements that describe the display update module 214 performing actions. Such statements should be understood to mean that when the software instructions of the display update module 214 are executed by the processing unit 202, the server computing system 102 performs the actions.

The database 206 is a data structure that stores data. Some or all of the data may be resources associated with the canvas 212. The database 206 may be implemented in a variety of ways. For example, the database 206 may be implemented as a file system. In a second example, the database 206 may be implemented as a relational database. In this second example, the database 206 may contain tables comprising database entries that represent or include resources.

The canvas 212 may be stored on the data storage system 200 in a variety of ways. For example, the canvas 212 may be stored as a flat file, a relational database, a network database, an object database, or another type of data structure.

As described in detail below, the event listener module 208 listens for input from the client computing systems 104. Example types of input include interaction input indicating that a user is interacting with a target resource, canvas open input indicating that a user wants to start viewing a portion of the canvas 212, and so on. When the event listener module 208 detects an input from the client computing systems 104, the event listener module 208 instructs the canvas modification module 210 to modify the canvas 212 appropriately. The display update module 214 reads the canvas 212 and causes the display devices 106 to repeatedly update the user interfaces such that the user interfaces reflect a substantially current state of the canvas 212.

Figure 3:
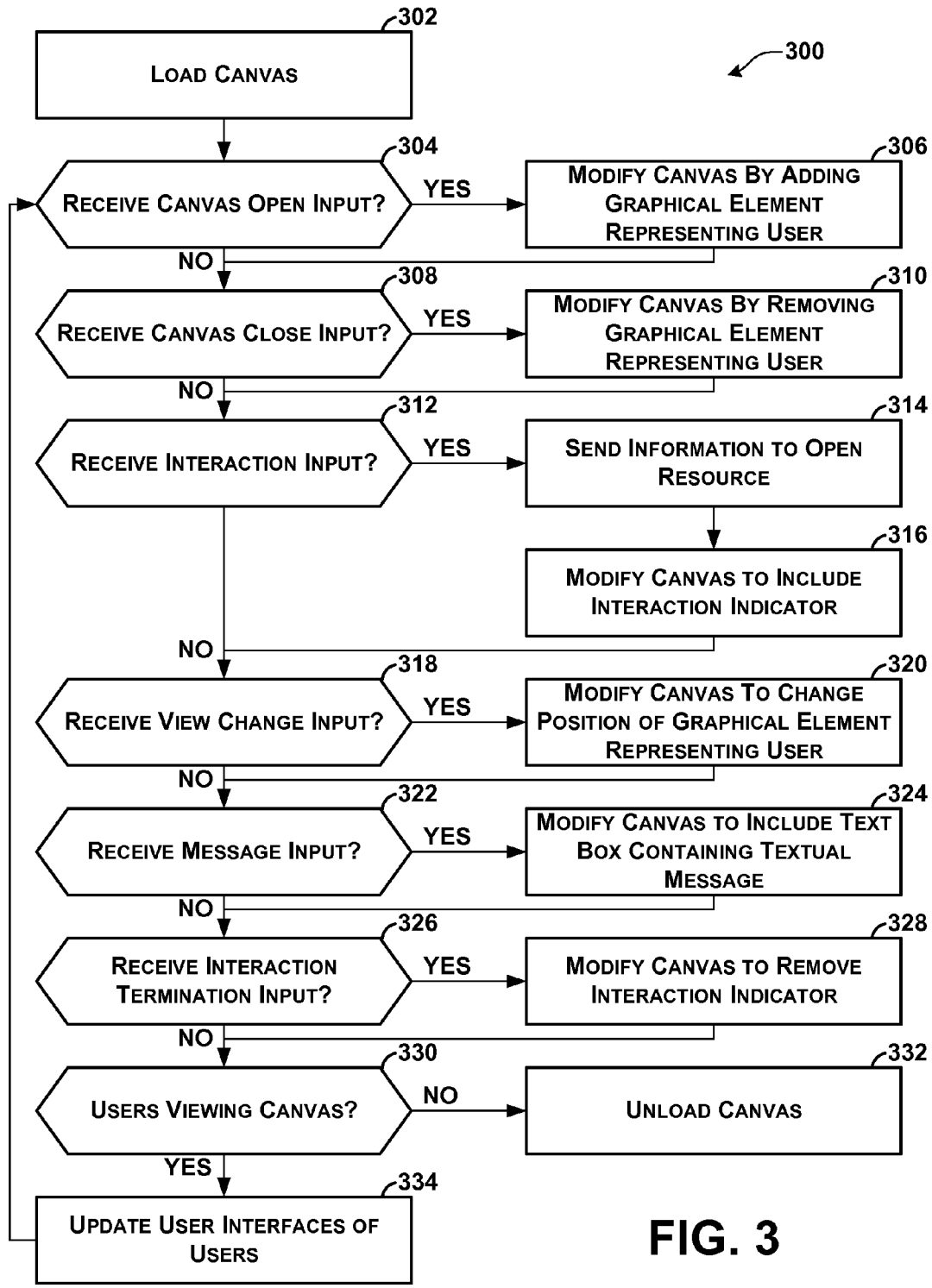
FIG. 3 is a flowchart illustrating an example operation of the server computing system.

FIG. 3 is a flowchart illustrating an example operation 300 of the server computing system 102. It should be appreciated that FIG. 3 is provided for explanatory purposes only and is not intended to represent a sole possible operation of the server computing system 102. In other implementations, the server computing system 102 may perform operations having more or fewer steps. Furthermore, in other implementations, the server computing system 102 may perform the steps of the operation 300, but in a different sequence. The operation 300 is explained with continuing reference to FIG. 1 and FIG. 2. It should be understood that the operation 300 may be implemented using a collaboration system other than collaboration system 100 and logical components other than those illustrated in the example of FIG. 2.

As illustrated in the example of FIG. 3, the operation 300 begins when the server computing system 102 loads the canvas 212 (302). In one example implementation, loading the canvas 212 entails copying some or all of the canvas 212 from a persistent computer-readable data storage medium such as a hard disk drive to a system memory space.

After the server computing system 102 has loaded the canvas 212, the event listener module 208 determines whether the server computing system 102 has received a canvas open input from a user (304). The canvas open input indicates that the user wishes to view the canvas 212. In response to determining that the server computing system 102 has received a canvas open input from a user ("YES" of 304), the canvas modification module 210 modifies the canvas 212 by adding a graphical element representing the user to the canvas 212 (306). In one example implementation, when the canvas modification module 210 adds the graphical element representing the user to the canvas 212, the canvas modification module 210 adds the graphical element representing the user to an origin point of the canvas 212.

After modifying the canvas 212 by adding a graphical element representing the user or after determining that the server computing system 102 has not received a canvas open input from a user ("NO" of 304), the event listener module 208 determines whether the server computing system 102 has received a canvas close input from a user (308). The canvas close input indicates that the user no longer wants to view the canvas 212. In response to determining that the server computing system 102 has received a canvas close input from a user ("YES" of 308), the canvas modification module 210 modifies the canvas 212 by removing the graphical element representing the user from the canvas 212 (310).

After modifying the canvas 212 by removing the graphical element representing the user or after determining that the server computing system 102 has not received a canvas close input from a user ("NO" of 308), the event listener module 208 determines whether the server computing system 102 has received interaction input from a user (312). The interaction input indicates that the user is interacting with a target resource in the set of resources associated with the canvas 212. As used in this disclosure, a resource is associated with the canvas 212 when the canvas 212 contains a graphical element representing the resource. In one example implementation, where the target resource is a file, the interaction input is a request to open the file. In response to determining that the server computing system 102 has received interaction input from a user ("YES" of 312), the canvas modification module 210 causes the network interface 204 to send, via the network 110, information necessary to open the target resource to a client computing system used by the user (314). As discussed above, the information necessary to open the target resource may vary depending on the type of the resource and/or other factors. After sending the information necessary to open the target resource, the canvas modification module 210 modifies the canvas 212 to include an interaction indicator (316). The interaction indicator graphically indicates that the user is currently interacting with the target resource by graphically indicating a relationship between the graphical element representing the user and the graphical element representing the target resource.

After modifying the canvas 212 to include the interaction indicator or after determining that the server computing system 102 has not received an interaction input from a user ("NO" of 312), the event listener module 208 determines whether the server computing system 102 has received a view change input from a user (318). The view change input indicates that the user wishes to change the portion of the canvas a display device is currently displaying to the user. In response to determining that the server computing system 102 has received a view change input from a user ("YES" of 318), the canvas modification module 210 modifies the canvas 212 to change the location within the canvas 212 of the graphical element representing the user (320). For example, the canvas modification module 210 may modify the location with the canvas 212 of the graphical element representing the user such that the graphical element representing the user is at the center of the view of the canvas displayed to the user.

After modifying the canvas 212 to change the location of the graphical element representing a user or after determining that the server computing system 102 has not received a view change input from a user ("NO" of 318), the event listener module 208 determines whether the server computing system 102 has received message input from a user (322). The message input comprises a message that the user wants to share with other users associated with the canvas 212. As used in this disclosure, a user is associated with a canvas when the user is one of the resources associated with the canvas. For example, the user might wish to explain to other users associated with the canvas that she is currently updating a particular spreadsheet file to include new sales data. In this example, the user may send message input to the server computing system 102 containing the message "Updating this spreadsheet to include new sales data."

In response to determining that the server computing system 102 has received message input from a user ("YES" of 322), the canvas modification module 210 modifies the canvas 212 to include a message box containing the message, the message box located in the canvas 212 adjacent to the graphical element representing the user (324). Depending on the implementation, the message box may persist in the canvas 212 for differing periods of time. For example, the message box may persist in the canvas 212 for ten seconds before disappearing. In a second example, the message box may persist in the canvas 212 until the user stops interacting with a resource or until the user provides additional message input. In a third example, the message box may persist indefinitely. In this third example, the message box may be scrollable and may contain previous messages from the user. For instance, in this third example, the message box may contain a first message that states "started reviewing the application" and a second message that states "this application is looking good . . . so far." It should be appreciated that in other implementations, the users can share types of media other than text in a fashion similar to that described above with regard to textual messages. For instance, the users can share pictures, audio clips, video clips, web links, and other types of media.

After modifying the canvas 212 to include a message box or after determining that the server computing system 102 has not received message input from a user ("NO" of 322), the event listener module 208 determines whether the server computing system 102 has received interaction termination input from a user who is interacting with a resource associated with the canvas 212 (326). The interaction termination input indicates that the user wants to stop interacting with the resource. In response to determining that the server computing system 102 has received interaction termination input ("YES" of 326), the canvas modification module 210 modifies the canvas 212 to remove an interaction indicator that indicates that the user is currently interacting with the resource (328).

After removing the interaction indicator or after determining that the server computing system 102 has not received interaction termination input from a user ("NO" of 326), the event listener module 208 determines whether there are any users still viewing any portion of the canvas 212 (330). If there are no users viewing any portion of the canvas 212 ("NO" of 330), the server computing system 102 unloads the canvas 212 (332). In one example implementation, unloading the canvas 212 entails deallocating memory locations that store a copy of the canvas 212.

On the other hand, if there are one or more users viewing portions of the canvas 212 ("YES" of 330), the display update module 214 causes the display devices 106 of users viewing portions of the canvas 212 to update the user interfaces such that the user interfaces reflect a substantially current state of the canvas 212 (334). It should be understood that the user interfaces only display the graphical elements in the canvas 212 when the graphical elements are located within the portions of the canvas 212 that the users are actually viewing. For example, suppose a user is viewing a rectangular portion of the canvas 212 having a lower-left corner at coordinates (10, 40) and an upper-right corner at coordinates (60, 90) and suppose that the canvas modification module 210 adds a new graphical element at coordinates (−43, −27). In this example, the display update module 214 may not cause the display device of the user to update the user interface to display the new graphical element.

In various implementations, the display update module 214 may update the user interfaces in a variety of ways. For example, where the server computing system 102 is connected to the client computing systems 104, the display update module 214 may send canvas display data to the client computing systems 104. In this example, the client computing systems 104 are configured to use the canvas display data to update the user interfaces on the display devices 106 such that the user interfaces reflect a substantially current state of the canvas 212. In a second example, the server computing system 102 may be directly connected to a display device. In this second example, the display update module 214 may directly send electrical signals to the display device to cause the display device to repeatedly update the user interface.

After the display update module 214 causes the display devices 106 to update the user interfaces, the server computing system 102 loops back and the event listener module 208 again determines whether the server computing system 102 has received canvas open input (304). The server computing system 102 continues to loop through the steps 304-332 until the event listener module 208 determines that no users are viewing any portion of the canvas. In this way, the display update module 214 repeatedly updates the user interfaces such that the user interfaces continuously reflect a substantially current state of the canvas 212.

It should be appreciated that the operation 300 may include additional steps for additional types of input. In a first example, the event listener module 208 determines whether the server computing system 102 has received move resource input from a user. The move resource input indicates that the user wishes to move a graphical element representing a resource associated with the canvas 212 from a first location within the canvas 212 to a second location within the canvas 212. For instance, a graphical element representing a resource may be located at coordinates (53, 85) in the canvas 212. In this instance, the move resource input may indicate that the user wants to move the graphical element representing the resource to a location at coordinates (123, 82) in the canvas 212. Users may wish to move the graphical elements representing resources for a variety of reasons. For instance, users may wish to move the graphical elements representing topically related resources such that they are located close together. In response to determining that the server computing system 102 has received move resource input from a user, the canvas modification module 210 modifies the canvas 212 to move a graphical element from one location within the canvas 212 to another location within the canvas 212.

In a second example, the event listener module 208 determines whether the server computing system 102 has received new resource input from a user. The new resource input indicates that the user wants to associate a new resource with the canvas 212. For instance, the user may want to associate a new word processor document with the canvas 212. In response to determining that the server computing system 102 has received new resource input, the canvas modification module 210 adds a graphical element representing the new resource to the canvas 212. In various implementations, the canvas modification module 210 may add the graphical element representing the new resource to the canvas 212 at various locations within the canvas 212. For instance, the canvas modification module 210 may add the graphical element representing the new resource to the canvas 212 at a location corresponding to a location of the user's cursor within the portion of the canvas 212 that is currently displayed to the user. In another example, the canvas modification module 210 may add the graphical element representing the new resource to the canvas 212 at an origin point of the canvas 212. The canvas modification module 210 may add a variety of different types of graphical elements to the canvas 212 based on the type of the new resource. For example, if the new resource is a word processor document, the canvas modification module 210 may add to the canvas 212 a graphical element that graphically represents a word processor document.

In other examples, the operation 300 may include additional steps for deleting resources, changing the graphical elements representing resources, and so on. However, these additional steps have been omitted from the example of FIG. 3 for purposes of clarity and conciseness.

Figure 4:
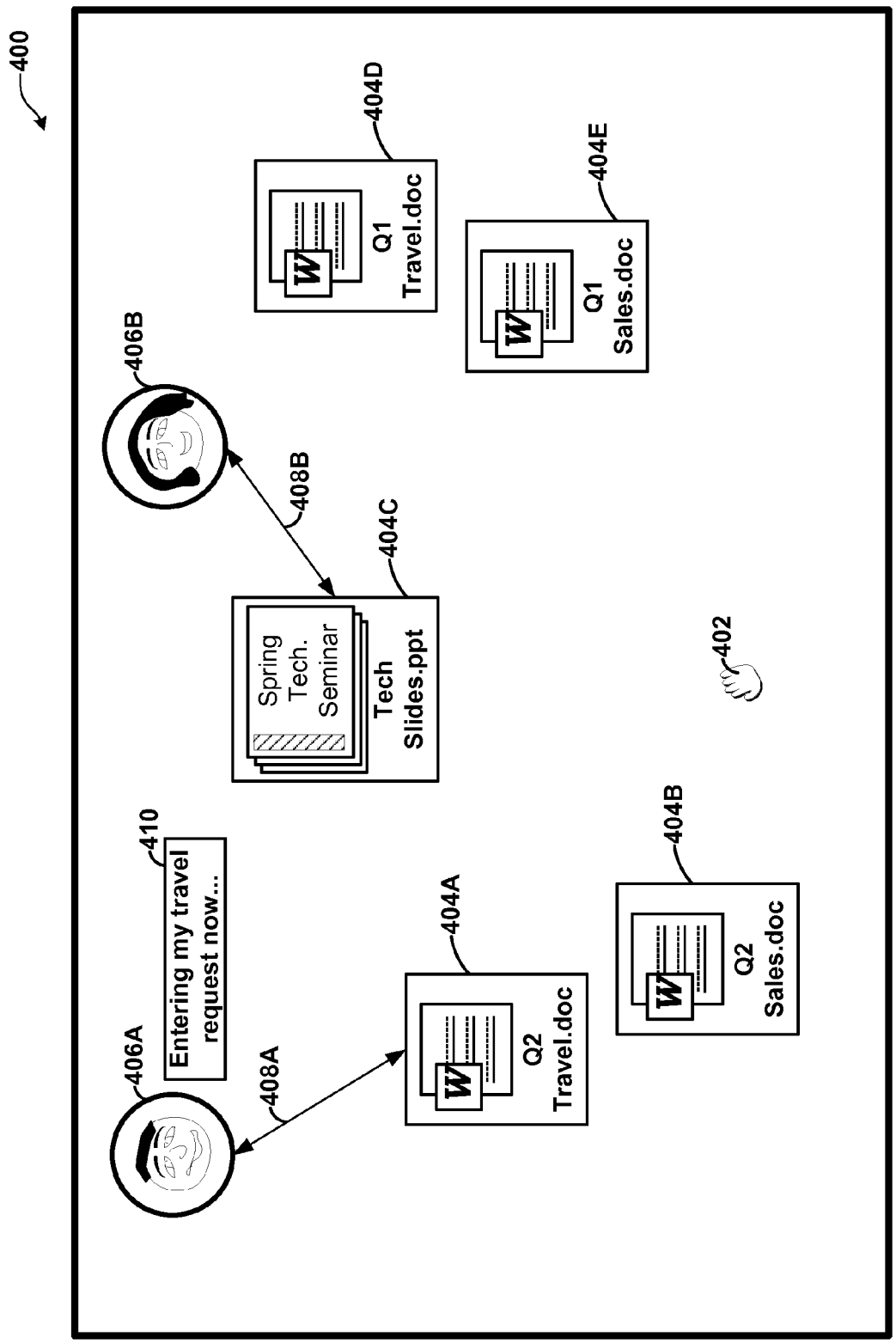
FIG. 4 is a screen diagram showing an example user interface.

FIG. 4 is a screen diagram showing an example user interface 400. It should be appreciated that the example of FIG. 4 is provided for purposes of explanation only. The user interface 400 illustrated in the example of FIG. 4 should not be interpreted to represent a sole possible user interface capable of presenting a portion of a canvas. Moreover, the content of the user interface 400 should not be interpreted to represent a sole possible way of displaying all or a portion of a canvas. Furthermore, the example of FIG. 4 is explained with reference to the examples of FIGS. 1 and 2. It should be appreciated that the user interface 400 may be implemented using different collaboration systems and/or different implementations of the server computing system 102.

The user interface 400 contains a portion of the canvas 212. In other words, the user interface 400 does not necessarily display all of the canvas 212. Rather, there may be portions of the canvas 212 not displayed in the user interface 400. In the example of FIG. 4, the user interface 400 includes a cursor 402. A user may control a position of the cursor 402 using an input device such as a mouse, keyboard, trackball, stylus, touch screen, and so on. In one example implementation, the user may control which portion of the canvas 212 is displayed in the user interface 400 by depressing a button while the cursor 402 is positioned within the user interface 400 and moving the cursor 402 in any direction while the button is depressed. In this example implementation, as the user moves the cursor 402, the server computing system 102 receives view change input and the portion of the canvas 212 displayed in the user interface 400 appears to move along with the cursor 402.

As illustrated in the example of FIG. 4, the user interface 400 also contains a plurality of discrete graphical elements 404A-404E (collectively, "graphical elements 404"). The graphical elements 404 represent documents. For instance, the graphical element 404A represents a document named "Q2 Travel.doc," the graphical element 404B represents a document named "Q2 Sales.doc," and so on. Each of the graphical elements 404 graphically describes the represented documents. For instance, the graphical elements 404A, 404B, 404D, and 404E include icons representative of Microsoft Word word processing documents.

In some implementations, graphical elements in the canvas 212 comprise thumbnails of files represented by the graphical elements. As used in this disclosure, a thumbnail of a file is a reduced-size image of the file. As illustrated in the example of FIG. 4, the graphical element 404C contains a thumbnail of the document represented by the graphical element 404C. The graphical element 404C represents a slide show document and the thumbnail in the graphical element 404C shows a first slide in the slide show document. In some example implementations, the thumbnail of a document displayed in the user interface 400 may change depending on what slide or page within the document is currently being viewed. For example, if a user is viewing a fifth slide in the slideshow document, the thumbnail in the graphical element 404C contains a reduced-size version of the fifth slide. Such implementations may enable users to have an even better understanding about how each of the users associated with the canvas 212 are presently working with resources associated with the canvas 212.

Furthermore, in the example of FIG. 4, the user interface 400 contains graphical elements 406A and 406B (collectively, "graphical elements 406"). The graphical elements 406 represent users. For example, the graphical element 406A may represent the user 108A and the graphical element 406B may represent the user 108B. In this example, the user interface 400 may be displayed to the user 108C.

As illustrated in the example of FIG. 4, the graphical elements 406 contain images of the users. In some example implementations, the users are able to select which images are contained in the graphical elements representing the users. For example, the user 108A may select a photograph of himself to be contained in a graphical element representing the user 108A and the user 108B may select an animated squirrel to be contained in a graphical element representing the user 108B. Although not illustrated in the example of FIG. 4, the graphical elements representing users may, in some implementations, contain textual names of the users.

The locations of the graphical elements 406 may be based in part on the portions of the canvas 212 that are being displayed to the users are currently viewing. For example, the locations of the graphical elements 406 may be equivalent to the centers of the portions of the canvas 212 that are currently being displayed to the users. Because the users are able to independently change the portions of the canvas that are being displayed to the users, the graphical elements 406 may appear to move within the user interface 400.

In the example of FIG. 4, the canvas 212 includes an interaction indicator 408A and an interaction indicator 408B (collectively, "interaction indicators 408"). The interaction indicator 408A graphically indicates that the user represented by the graphical element 406A is currently interacting with the document represented by the graphical element 404A. The interaction indicator 408B graphically indicates that the user represented by the graphical element 406B is currently interacting with the document represented by the graphical element 404C.

Furthermore, in the example of FIG. 4, the canvas 212 includes a message box 410. The message box 410 is located within the canvas 212 adjacent to the graphical element 406A. The message box 410 contains the message "Entering my travel request now . . . " In this way, the user represented by the graphical element 406A is able to inform other users associated with the canvas 212 that he is currently interacting with the document represented by the graphical element 404A to enter his travel request.

Figure 5:
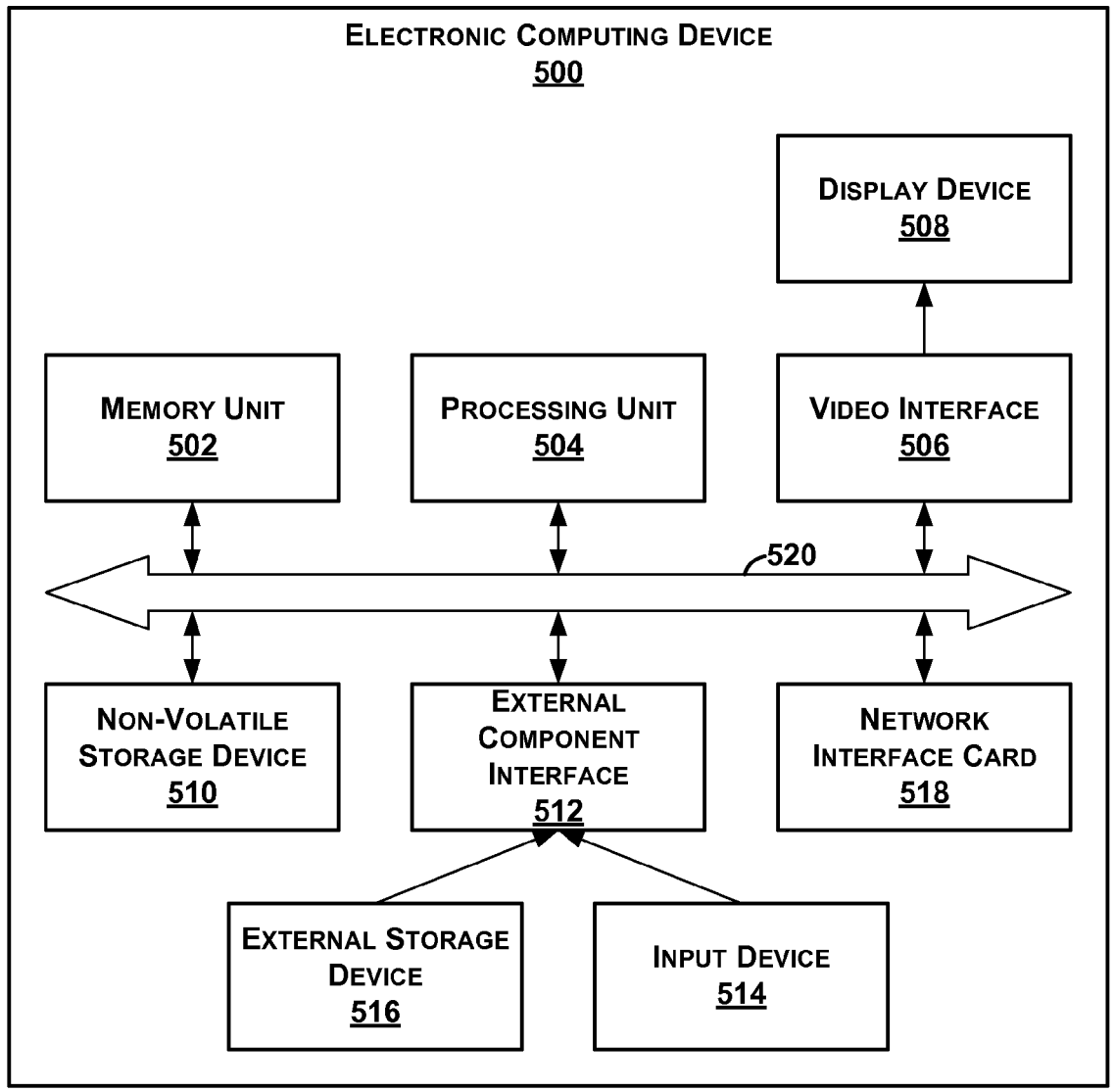
FIG. 5 is a block diagram illustrating example hardware details of an electronic computing device.

FIG. 5 is a block diagram illustrating example physical components of an electronic computing device 500. As illustrated in the example of FIG. 5, the electronic computing device 500 comprises a memory unit 502. The memory unit 502 is a computer-readable data storage medium capable of storing data and/or instructions. The memory unit 502 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, the electronic computing device 500 comprises a processing unit 504. As mentioned above, a processing unit is a set of one or more physical electronic integrated circuits that are capable of executing instructions. In a first example, the processing unit 504 may execute software instructions that cause the electronic computing device 500 to provide specific functionality. In this first example, the processing unit 504 may be implemented as one or more processing cores and/or as one or more separate microprocessors. For instance, in this first example, the processing unit 504 may be implemented as one or more Intel Core 2 microprocessors. The processing unit 504 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, the processing unit 504 may be implemented as an ASIC that provides specific functionality. In a third example, the processing unit 504 may provide specific functionality by using an ASIC and by executing software instructions.

The electronic computing device 500 also comprises a video interface 506. The video interface 506 enables the electronic computing device 500 to output video information to a display device 508. The display device 508 may be a variety of different types of display devices. For instance, the display device 508 may be a cathode-ray tube display, an LCD display panel, a plasma screen display panel, a touch-sensitive display panel, a LED array, or another type of display device.

In addition, the electronic computing device 500 includes a non-volatile storage device 510. The non-volatile storage device 510 is a computer-readable data storage medium that is capable of storing data and/or instructions. The non-volatile storage device 510 may be a variety of different types of non-volatile storage devices. For example, the non-volatile storage device 510 may be one or more hard disk drives, magnetic tape drives, CD-ROM drives, DVD-ROM drives, Blu-Ray disc drives, or other types of non-volatile storage devices.

The electronic computing device 500 also includes an external component interface 512 that enables the electronic computing device 500 to communicate with external components. As illustrated in the example of FIG. 5, the external component interface 512 enables the electronic computing device 500 to communicate with an input device 514 and an external storage device 516. In one implementation of the electronic computing device 500, the external component interface 512 is a Universal Serial Bus (USB) interface. In other implementations of the electronic computing device 500, the electronic computing device 500 may include another type of interface that enables the electronic computing device 500 to communicate with input devices and/or output devices. For instance, the electronic computing device 500 may include a PS/2 interface. The input device 514 may be a variety of different types of devices including, but not limited to, keyboards, mice, trackballs, stylus input devices, touch pads, touch-sensitive display screens, or other types of input devices. The external storage device 516 may be a variety of different types of computer-readable data storage media including magnetic tape, flash memory modules, magnetic disk drives, optical disc drives, and other computer-readable data storage media.

In addition, the electronic computing device 500 includes a network interface card 518 that enables the electronic computing device 500 to send data to and receive data from an electronic communication network. The network interface card 518 may be a variety of different types of network interface. For example, the network interface card 518 may be an Ethernet interface, a token-ring network interface, a fiber optic network interface, a wireless network interface (e.g., WiFi, WiMax, etc.), or another type of network interface.

The electronic computing device 500 also includes a communications medium 520. The communications medium 520 facilitates communication among the various components of the electronic computing device 500. The communications medium 520 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The electronic computing device 500 includes several computer-readable data storage media (i.e., the memory unit 502, the non-volatile storage device 510, and the external storage device 516). Together, these computer-readable storage media may constitute a single data storage system (e.g., the data storage system 200). As discussed above, a data storage system is a set of one or more computer-readable data storage mediums. This data storage system may store instructions executable by the processing unit 504. Activities described in the above description may result from the execution of the instructions stored on this data storage system. Thus, when this description says that a particular logical module performs a particular activity, such a statement may be interpreted to mean that instructions of the logical module, when executed by the processing unit 504, cause the electronic computing device 500 to perform the activity. In other words, when this description says that a particular logical module performs a particular activity, a reader may interpret such a statement to mean that the instructions configure the electronic computing device 500 such that the electronic computing device 500 performs the particular activity.

The techniques of this disclosure may be implemented in a variety of ways. For example, the techniques of this disclosure may be implemented as a method for displaying a canvas that facilitates collaboration among a plurality of users. The method comprises receiving, at a computing system, interaction input indicating that a first user in the plurality of users is interacting with a target resource in a plurality of resources. Each resource in the plurality of resources is associated with a canvas shared by the plurality of users. The canvas is a multidimensional graphical space. Each resource in the plurality of resources is graphically represented by a graphical element in a plurality of discrete graphical elements. Each graphical element in the plurality of discrete graphical elements is located at an arbitrary location within the canvas. Each user in the plurality of users is a resource in the plurality of resources. A first graphical element in the plurality of discrete graphical elements graphically represents the first user. A target graphical element in the plurality of discrete graphical elements graphically represents the target resource. The method also comprises in response to receiving the interaction input, modifying, by the computing system, the canvas to include an interaction indicator. The interaction indicator is a graphical element. The interaction indicator graphically indicates a relationship between the first graphical element and the target graphical element such that the interaction indicator graphically indicates that the first user is currently interacting with the target resource. The method also comprises causing, by the computing system, a plurality of display devices to repeatedly update user interfaces displayed by the display devices such that the user interfaces reflect a substantially current state of the canvas. The substantially current state of the canvas is the plurality of discrete graphical elements along with locations within the canvas of the graphical elements of the plurality of discrete graphical elements at a substantially current moment.

In another example, the techniques of this disclosure may be realized as a computing system. The computing system comprises a processing unit comprising at least one integrated circuit. In addition, the computing system comprises a data storage system comprising at least one computer-readable data storage medium. The data storage system stores software instructions that, when executed by the processing unit, cause the computing system to determine whether the computing system has received interaction input. The interaction input indicates that a first user in a plurality of users wants to interact with a target resource in a plurality of resources. The plurality of resources is associated with a canvas shared by the plurality of users. The canvas is a multidimensional graphical space. Each resource in the plurality of resources is graphically represented by a graphical element in a plurality of discrete graphical elements. Each graphical element in the plurality of discrete graphical elements is located at an arbitrary location within the canvas. Each user in the plurality of users is a resource in the plurality of resources. A first graphical element in the plurality of discrete graphical elements graphically represents the first user. A target graphical element in the plurality of discrete graphical elements graphically represents the target resource. The software instructions also cause the computing system to modify, in response to determining that the computing system has received the interaction input, the canvas to include an interaction indicator. The interaction indicator is a graphical element. The interaction indicator graphically indicates a relationship between the first graphical element and the target graphical element such that the interaction indicator indicates that the first user is currently interacting with the target resource. In addition, the software instructions cause the computing system to cause a plurality of display devices associated with the plurality of users to repeatedly update user interfaces displayed by the display devices such that the user interfaces reflect a substantially current state of the canvas. The substantially current state of the canvas is the plurality of discrete graphical elements along with locations within the canvas of the graphical elements of the plurality of discrete graphical elements at a substantially current moment.

In another example, the techniques of this disclosure may be implemented as a data storage system comprising at least one computer-readable data storage medium. The at least one computer-readable data storage medium stores software instructions that, when executed by a processing unit of a server computing system, cause the server computing system to determine whether the server computing system has received interaction input. The interaction input indicates that a user who originated the interaction input wants to interact with a target resource in a plurality of resources. Each resource in the plurality of resources is associated with an infinite canvas shared by a plurality of users. The infinite canvas is a multidimensional graphical space. Each resource in the plurality of resources graphically is represented by a graphical element in a plurality of discrete graphical elements. Each graphical element in the plurality of discrete graphical elements is located at an arbitrary location within the infinite canvas. Each user in the plurality of users is a resource in the plurality of resources. The plurality of resources includes a set of documents. The plurality of users includes the user who originated the interaction input. Each resource in the plurality of resources is associated with a project. The project is a planned undertaking of an enterprise to achieve a specific goal. A first graphical element in the plurality of discrete graphical elements graphically represents the user who originated the interaction input. A target graphical element in the plurality of discrete graphical elements graphically represents the target resource. Furthermore, the software instructions cause the server computing system to send, in response to determining that the server computing system has received the interaction input, to a client computing system used by the user who originated the interaction input, information needed by the client computing system to interact with the target resource. The software instructions also cause the server computing system to modify, in response to determining that the server computing system has received the interaction input, the infinite canvas to include a first interaction indicator. The first interaction indicator graphically indicates that the user who originated the interaction input is currently interacting with the target resource. The first interaction indicator comprises a line connecting the first graphical element and the target graphical element. In addition, the software instructions cause the server computing system to determine whether the server computing system has received canvas open input. The canvas open input indicates that a user who originated the canvas open input wishes to view the infinite canvas. Furthermore, the software instructions cause the server computing system to modify, in response to determining that the server computing system has received the canvas open input, the infinite canvas to include a second graphical element, the second graphical element graphically representing the user who originated the canvas open input. Moreover, the software instructions cause the server computing system to determine whether the server computing system has received canvas close input, the canvas close input indicating that a user who originated the canvas close input wishes to close the infinite canvas. In addition, the software instructions cause the server computing system to modify, in response to determining that the server computing system has received the canvas close input, the infinite canvas to remove from the infinite canvas a third graphical element in the plurality of discrete graphical elements. The third graphical element graphically represents the user who originated the canvas close input. In addition, the software instructions cause the server computing system to determine whether the server computing system has received view change input. The view change input indicates that a user who originated the view change input wishes to change a portion of the infinite canvas currently displayed to the user who originated the view change input. In addition, the software instructions cause the server computing system to modify, in response to determining that the server computing system has received the view change input, the infinite canvas to move a fourth graphical element in the plurality of discrete graphical elements from a first location within the infinite canvas to a second location within the infinite canvas. The second location within the infinite canvas being within a view of the infinite canvas currently displayed to the user who originated the view change input. The fourth graphical element graphically representing the user who originated the view change input. Moreover, the software instructions cause the server computing system to determine whether the server computing system has received message input. The message input comprises a message that a user who originated the message input wishes to share with other users in the plurality of users. A fifth graphical element in the plurality of discrete graphical elements graphically represents the user who originated the message input. The software instructions also cause the server computing system to modify, in response to determining that the server computing system has received message input, the infinite canvas to include a message box located within the infinite canvas adjacent to the fifth graphical element. The message box contains the message. In addition, the software instructions cause the server computing system to determine whether the server computing system has received interaction termination input. The interaction termination input indicating that a user who originated the interaction termination input wants to stop interacting with a given resource in the plurality of resources. The plurality of discrete graphical elements includes a given graphical element representing the given resource. In addition, the software instructions cause the server computing system to modify, in response to determining that the server computing system has received the interaction termination input, the infinite canvas to remove a second interaction indicator from the infinite canvas. The second interaction indicator indicating that the user who originated the interaction termination input is currently interacting with the given resource. Furthermore, the software instructions cause the server computing system to cause a plurality of display devices associated with the plurality of users to repeatedly update user interfaces displayed by the display devices such that the user interfaces reflect a substantially current state of the canvas. The substantially current state of the canvas being the plurality of discrete graphical elements along with locations within the canvas of the graphical elements of the plurality of discrete graphical elements at a substantially current moment. The processing unit comprises at least one microprocessor. The user who originated the interaction input, the user who originated the canvas open input, the user who originated the canvas close input, the user who originated the view change input, the user who originated the message input, and the user who originated the interaction termination input are in the plurality of users.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for displaying a canvas that facilitates collaboration among a plurality of users, the method comprising:

receiving, at a computing system, interaction input indicating that a first user in the plurality of users is interacting with a target resource in a plurality of resources, each resource in the plurality of resources being associated with a canvas shared by the plurality of users, the canvas being a multidimensional graphical space, each resource in the plurality of resources graphically represented by a graphical element in a plurality of discrete graphical elements, each graphical element in the plurality of discrete graphical elements located at an arbitrary location within the canvas, each user in the plurality of users being a resource in the plurality of resources, a first graphical element in the plurality of discrete graphical elements graphically representing the first user, a target graphical element in the plurality of discrete graphical elements graphically representing the target resource;

in response to determining that the server computing system has received the interaction input, sending to a client computing system used by the user who originated the interaction input, information needed by the client computing system to interact with the target resource;

in response to receiving the interaction input, modifying, by the computing system, the canvas to include an interaction indicator, the interaction indicator being a graphical element, the interaction indicator graphically indicating a relationship between the first graphical element and the target graphical element such that the interaction indicator graphically indicates that the first user is currently interacting with the target resource;

causing, by the computing system, a plurality of display devices to repeatedly update user interfaces displayed by the display devices such that the user interfaces reflect a substantially current state of the canvas, the substantially current state of the canvas being the plurality of discrete graphical elements along with locations within the canvas of the graphical elements of the plurality of discrete graphical elements at a substantially current moment, wherein each of the user interfaces displayed by each of the plurality of display devices reflects a different portion of the canvas, wherein a portion of the canvas comprises a contiguous graphical subspace within the canvas, wherein one of the plurality of display devices displays a first rectangular portion of the canvas defined by a plurality of coordinates, wherein another one of the plurality of display devices displays a second rectangular portion of the canvas defined by another plurality of coordinates.

2. The method of claim 1, wherein each resource in the plurality of resources is associated with a project, the project being a planned undertaking of an enterprise to achieve a specific goal.

3. The method of claim 1, wherein the first graphical element is located within the canvas at the location within the canvas corresponding to a portion of the canvas that is currently being displayed to the first user.

4. The method of claim 1, wherein receiving the interaction input comprises:
receiving, at the computing system, a request to open the target resource, the computing system receiving the request from a client computing system; and
in response to receiving the request, sending, from the computing system to the client computing system, information needed by the client computing system to open the target resource.

5. The method of claim 1, wherein a given graphical element in the plurality of discrete graphical elements graphically represents a file in the plurality of resources, the given graphical element comprising a thumbnail of the file.

6. The method of claim 5, wherein the given graphical element comprising a thumbnail of the file comprises a first slide in a slide show document.

7. The method of claim 1,
wherein the target resource is a file; and
wherein causing the display devices to repeatedly update the user interfaces comprises updating, by the server computing system, a thumbnail of the target resource such that the thumbnail is based on a part of the target resource with which the first user is currently interacting.

8. The method of claim 1, wherein a given graphical element in the plurality of discrete graphical elements graphically represents a given user in the plurality of users, the given graphical element comprising an image selected by the given user.

9. The method of claim 1 further comprising:
receiving, by the computing system, message input from a given user in the plurality of users, the message input specifying a message; and
in response to receiving the message input, modifying, by the computing system, the canvas to include a message box containing the message, the message box located in the canvas adjacent to a given graphical element in the plurality of discrete graphical elements, the given graphical element graphically representing the given user.

10. The method of claim 9, further comprising persisting the message box in the canvas only until the first user tops interacting with the target resource.

11. The method of claim 1, wherein each user in the plurality of users is linked to the first user in a social networking service.

12. The method of claim 1, wherein the canvas is three-dimensional.

13. The method of claim 1,
wherein the computing system is a server computing system;
wherein the display devices are communicatively connected to a plurality of client computing systems; and
wherein causing the display devices to repeatedly update the user interfaces comprises sending, by the server computing system, canvas display data to each client computing system in the plurality of client computing systems, each client computing system in the plurality of client computing systems configured to use the canvas display data to update the user interfaces on the display devices such that the user interfaces reflect the substantially current state of the canvas.

14. The method of claim 1,
wherein the computing system comprises a data storage system and a processing unit, the data storage system comprising at least one computer-readable data storage medium that stores software instructions, the processing unit comprising at least one integrated circuit; and
wherein the software instructions cause the computing system to perform the steps of claim 1 when the processing unit executes the software instructions.

15. A computing system comprising:
a processing unit comprising at least one integrated circuit; and
a data storage system comprising at least one computer-readable data storage medium, the data storage system storing software instructions that, when executed by the processing unit, cause the computing system to:
determine whether the processing unit has received interaction input, the interaction input indicating that a first user in a plurality of users wants to interact with a target resource in a plurality of resources, the plurality of resources associated with a canvas shared by the plurality of users, the canvas being a multidimensional graphical space, each resource in the plurality of resources graphically represented by a graphical element in a plurality of discrete graphical elements, each graphical element in the plurality of discrete graphical elements located at an arbitrary location within the canvas, each user in the plurality of users being a resource in the plurality of resources, a first graphical element in the plurality of discrete graphical elements graphically representing the first user, a target graphical element in the plurality of discrete graphical elements graphically representing the target resource;
modify, in response to determining that the processing unit has received the interaction input, the canvas to include an interaction indicator, the interaction indicator being a graphical element, the interaction indicator graphically indicating a relationship between the first graphical element and the target graphical element such that the interaction indicator indicates that the first user is currently interacting with the target resource; and cause a plurality of display devices associated with the plurality of users to repeatedly update user interfaces displayed by the display devices such that the user interfaces reflect a substantially current state of the canvas, the substantially current state of the canvas being the plurality of discrete graphical elements along with locations within the canvas of the graphical elements of the plurality of discrete graphical elements at a substantially current moment, wherein each of the user interfaces displayed by each of the plurality of display devices reflects a different portion of the canvas, wherein a portion of the canvas comprises a contiguous graphical subspace within the canvas, wherein one of the plurality of display devices displays a first rectangular portion of the canvas defined by a plurality of coordinates, wherein another one of the plurality of display devices displays a second rectangular portion of the canvas defined by another plurality of coordinates.

16. The computing system of claim 15, wherein the software instructions, when executed by the processing unit, further cause the processing unit to automatically locate the first graphical element within the canvas based on a portion of the canvas that is displayed to the first user.

17. The computing system of claim 15, wherein the software instructions, when executed by the processing unit, further cause the computing system to:

determine whether the processing unit has received message input from a given user, a given graphical element in the plurality of discrete graphical elements graphically representing the given user; and in response to determining that the processing unit has received the message input from the given user, modifying the canvas to include a message box located within the canvas adjacent to the given graphical element, the message box containing a message that the given user wishes to express to other users.

18. The computing system of claim 15, wherein the software instructions, when executed by the processing unit, further cause the computing system to:

determine whether the processing unit has received canvas open input from a given user in the plurality of users, the canvas open input indicating that the given user wishes to view the canvas; and in response to determining that the processing unit has received the canvas open input from the given user, modifying the canvas to include a new graphical element, the new graphical element graphically representing the given user.

19. A data storage system comprising at least one computer-readable data storage medium, the at least one computer-readable data storage medium storing software instructions that, when executed by a processing unit of a server computing system, cause the server computing system to:

determine whether the server computing system has received interaction input, the interaction input indicating that a user who originated the interaction input wants to interact with a target resource in a plurality of resources, each resource in the plurality of resources associated with an infinite canvas shared by a plurality of users, the infinite canvas being a multidimensional graphical space, each resource in the plurality of resources graphically represented by a graphical element in a plurality of discrete graphical elements, each graphical element in the plurality of discrete graphical elements located at an arbitrary location within the infinite canvas, each user in the plurality of users being a resource in the plurality of resources, the plurality of resources including a set of documents, the plurality of users including the user who originated the interaction input, each resource in the plurality of resources being associated with a project, the project being a planned undertaking of an enterprise to achieve a specific goal, a first graphical element in the plurality of discrete graphical elements graphically representing the user who originated the interaction input, a target graphical element in the plurality of discrete graphical elements graphically representing the target resource;

send, in response to determining that the server computing system has received the interaction input, to a client computing system used by the user who originated the interaction input, information needed by the client computing system to interact with the target resource;

modify, in response to determining that the server computing system has received the interaction input, the infinite canvas to include a first interaction indicator, the first interaction indicator graphically indicating that the user who originated the interaction input is currently interacting with the target resource;

determine whether the server computing system has received canvas open input, the canvas open input indicating that a user who originated the canvas open input wishes to view the infinite canvas;

modify, in response to determining that the server computing system has received the canvas open input, the infinite canvas to include a second graphical element, the second graphical element graphically representing the user who originated the canvas open input;

determine whether the server computing system has received canvas close input, the canvas close input indicating that a user who originated the canvas close input wishes to close the infinite canvas;

modify, in response to determining that the server computing system has received the canvas close input, the infinite canvas to remove from the infinite canvas a third graphical element in the plurality of discrete graphical elements, the third graphical element graphically representing the user who originated the canvas close input;

determine whether the server computing system has received view change input, the view change input indicating that a user who originated the view change input wishes to change a portion of the infinite canvas currently displayed to the user who originated the view change input;

modify, in response to determining that the server computing system has received the view change input, the infinite canvas to move a fourth graphical element in the plurality of discrete graphical elements from a first location within the infinite canvas to a second location within the infinite canvas, the second location within the infinite canvas being within a view of the infinite canvas currently displayed to the user who originated the view change input, the fourth graphical element graphically representing the user who originated the view change input;

determine whether the server computing system has received message input, the message input comprising a message that a user who originated the message input wishes to share with other users in the plurality of users, a fifth graphical element in the plurality of discrete graphical elements graphically representing the user who originated the message input, modify, in response to determining that the server computing system has received message input, the infinite canvas to include a message box located within the infinite canvas adjacent to the fifth graphical element, the message box containing the message;

determine whether the server computing system has received interaction termination input, the interaction termination input indicating that a user who originated the interaction termination input wants to stop interacting with a given resource in the plurality of resources, the plurality of discrete graphical elements including a given graphical element representing the given resource;

modify, in response to determining that the server computing system has received the interaction termination input, the infinite canvas to remove a second interaction indicator from the infinite canvas, the second interaction indicator indicating that the user who originated the interaction termination input is currently interacting with the given resource; and cause a plurality of display devices associated with the plurality of users to repeatedly update user interfaces displayed by the display devices such that the user interfaces reflect a substantially current state of the canvas, the substantially current state of the canvas being the plurality of discrete graphical elements along with locations within the canvas of the graphical elements of the plurality of discrete graphical elements at a substantially current moment, wherein each of the user interfaces displayed by each of the plurality of display devices reflects a different portion of the canvas, wherein a portion of the canvas comprises a contiguous graphical subspace within the canvas, wherein one of the plurality of display devices displays a first rectangular portion of the canvas defined by a plurality of coordinates, wherein another one of the plurality of display devices displays a second rectangular portion of the canvas defined by another plurality of coordinates, wherein the processing unit comprises at least one microprocessor, wherein the user who originated the interaction input, the user who originated the canvas open input, the user who originated the canvas close input, the user who originated the view change input, the user who originated the message input, and the user who originated the interaction termination input are in the plurality of users.

* * * * *